United States Patent
Liao et al.

(10) Patent No.: US 9,055,646 B2
(45) Date of Patent: Jun. 9, 2015

(54) LIGHT EMITTING DEVICE DRIVER CIRCUIT AND CONTROL METHOD THEREOF

(71) Applicants: Chia-Wei Liao, Zhubei (TW); Jing-Meng Liu, Zhubei (TW)

(72) Inventors: Chia-Wei Liao, Zhubei (TW); Jing-Meng Liu, Zhubei (TW)

(73) Assignee: RICHTEK TECHNOLOGY CORPORATION, R.O.C., Chupei, Hsinchu ( * ) Notice: Subject to any disclaimer, the term of this patent is extended or adjusted under 35 U.S.C. 154(b) by 366 days.

(21) Appl. No.: 13/775,156

(22) Filed: Feb. 23, 2013

(65) Prior Publication Data

US 2013/0221875 A1 Aug. 29, 2013

Related U.S. Application Data

(60) Provisional application No. 61/602,858, filed on Feb. 24, 2012, provisional application No. 61/692,585, filed on Aug. 23, 2012, provisional application No. 61/700,870, filed on Sep. 13, 2012.

(51) Int. Cl.
H05B 33/08 (2006.01)

(52) U.S. Cl.
CPC ........ *H05B 33/0851* (2013.01); *H05B 33/0815* (2013.01)

(58) Field of Classification Search
USPC ...... 315/291, 294, 297, 312, 307, 308, 209 R
See application file for complete search history.

(56) References Cited

U.S. PATENT DOCUMENTS

| 2012/0086360 A1* | 4/2012 | Weng | 315/307 |
| 2013/0093351 A1* | 4/2013 | Chiu | 315/291 |

FOREIGN PATENT DOCUMENTS

CN 202111896 1/2012

* cited by examiner

*Primary Examiner* — Douglas W Owens
*Assistant Examiner* — Jonathan Cooper
(74) *Attorney, Agent, or Firm* — Tung & Associates

(57) ABSTRACT

The present invention discloses a light emitting device circuit and a control method thereof. The light emitting device circuit includes: a light emitting device control circuit, for converting an input voltage to an output voltage according to a control signal, wherein the output voltage is supplied to a light emitting device circuit; a voltage supply circuit, which is coupled to the light emitting device circuit, for generating a supply voltage from the output voltage; and a remote control circuit, which is coupled to the voltage supply circuit, for receiving the supply voltage, and generating the control signal according to a remote signal.

35 Claims, 15 Drawing Sheets

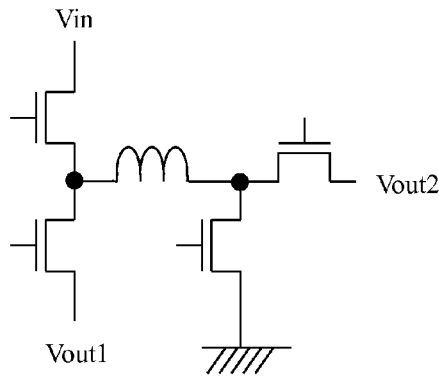
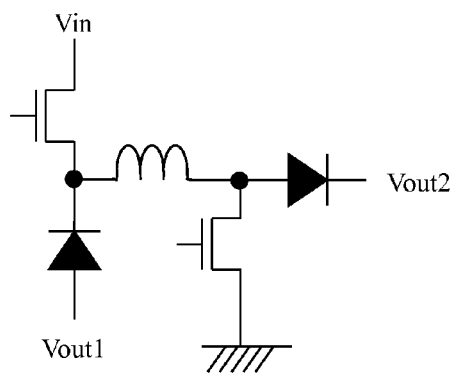
Fig. 8I  Fig. 8J
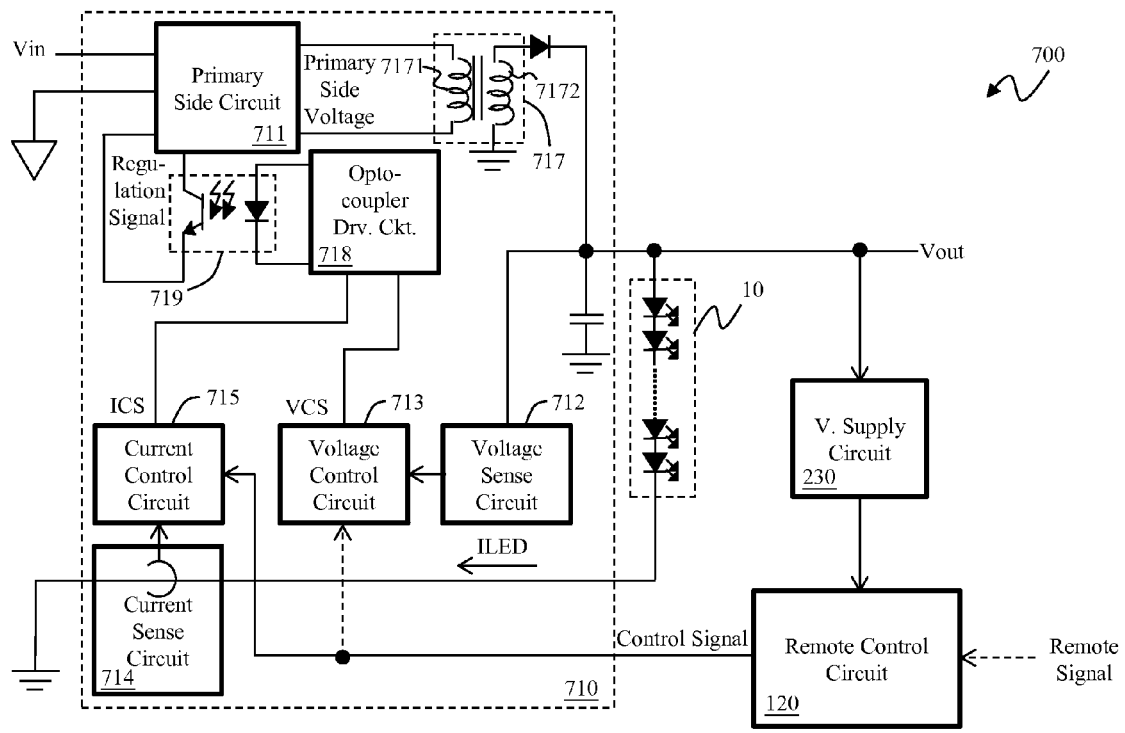
Fig. 9

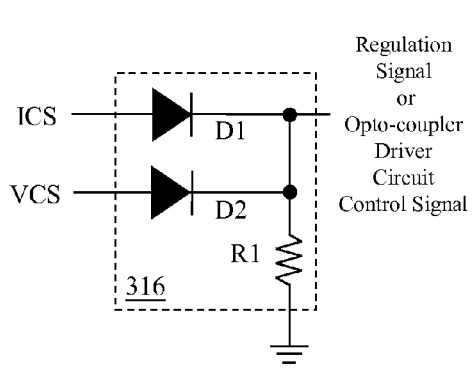
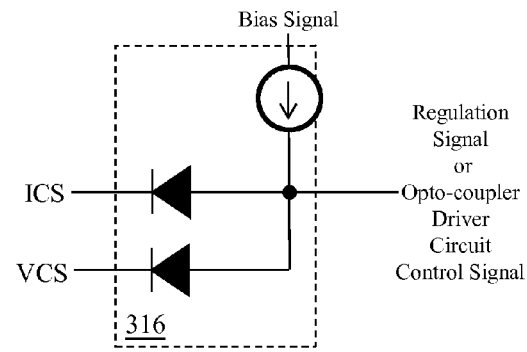
Fig. 16A
Fig. 16B
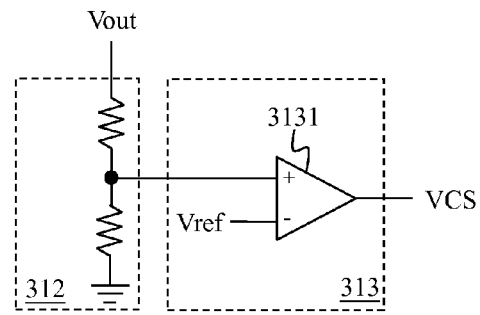
Fig. 17
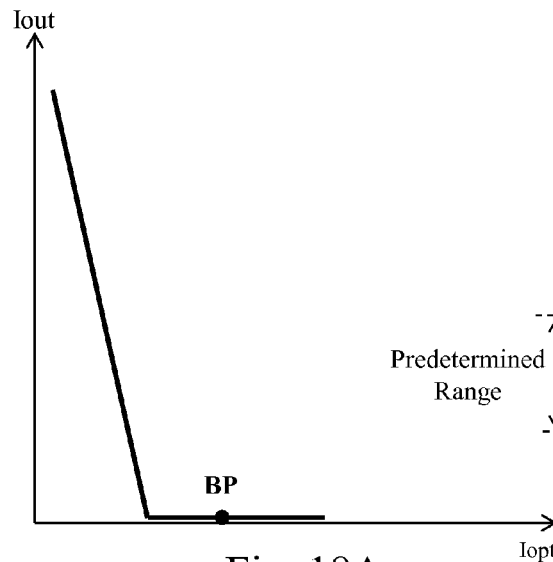
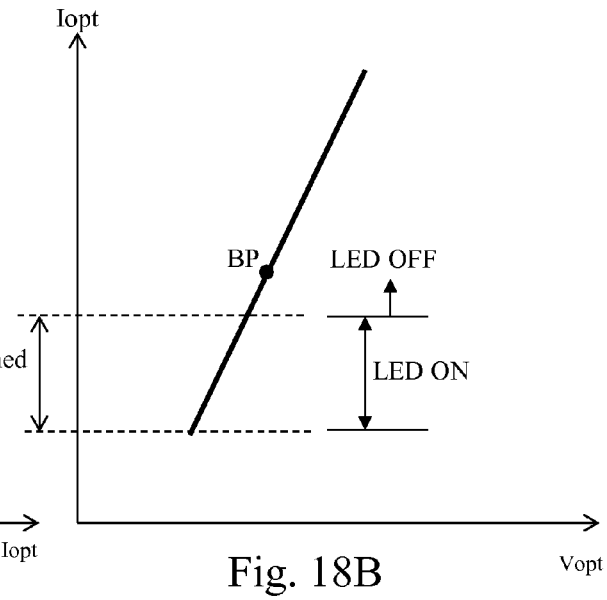
Fig. 18A
Fig. 18B BEST AVAILABLE IMAGE
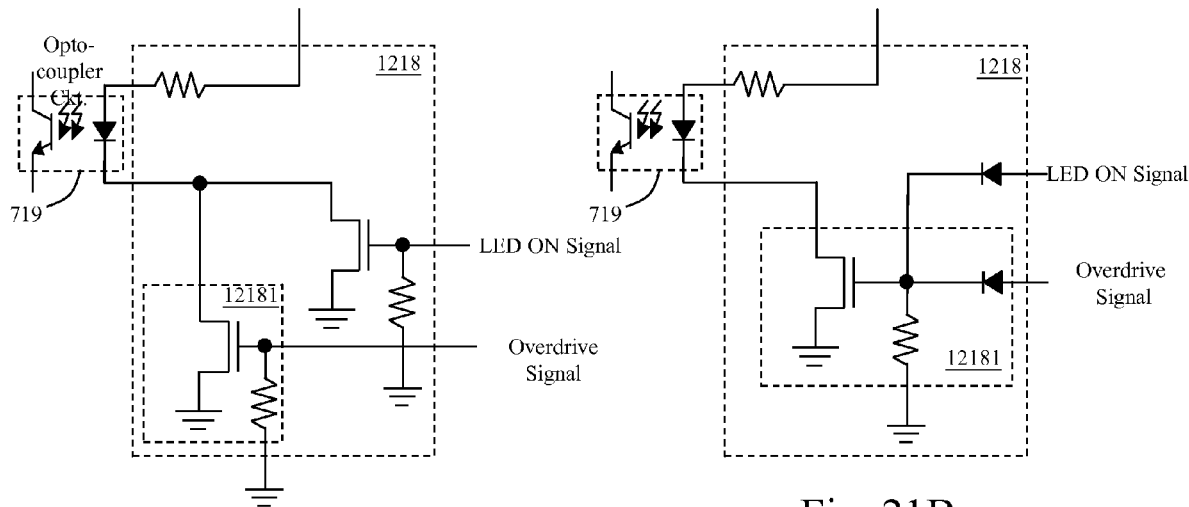
Fig. 21A
Fig. 21B
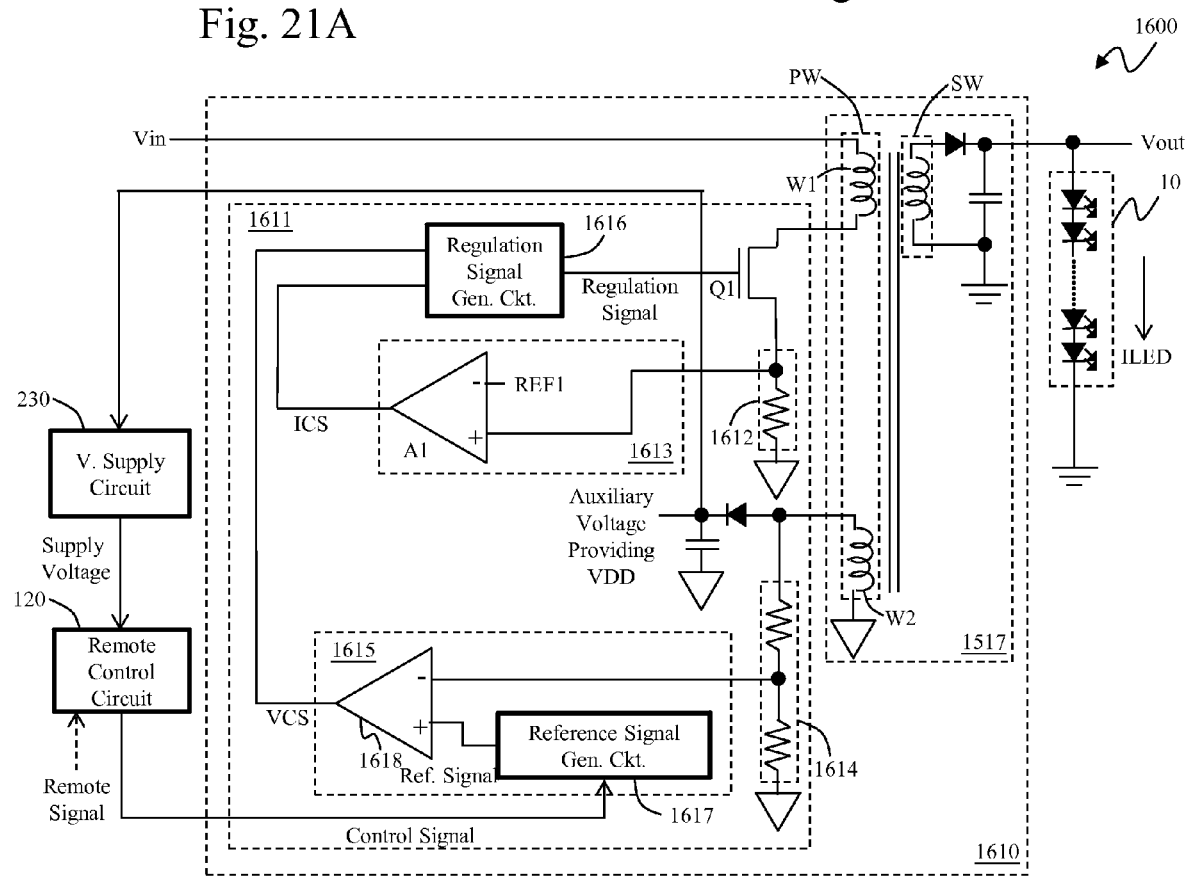
Fig. 22

LIGHT EMITTING DEVICE DRIVER CIRCUIT AND CONTROL METHOD THEREOF

CROSS REFERENCE

The present invention claims priority to U.S. provisional applications No. 61/602,858, filed on Feb. 24, 2012; No. 61/692,585, filed on Aug. 23, 2012; and No. 61/700,870, filed on Sep. 13, 2012.

BACKGROUND OF THE INVENTION

1. Field of Invention

The present invention relates to a light emitting device circuit and a control method thereof; particularly, it relates to such light emitting device circuit and control method thereof with a remote control circuit.

2. Description of Related Art

FIG. 1 shows a schematic diagram of a light emitting diode (LED) driver circuit 100. The LED driver circuit 100 is for driving an LED circuit 10. As shown in FIG. 1, the LED driver circuit 100 includes an LED control circuit 110, a remote control circuit 120, and a voltage supply circuit 130. The LED control circuit 110 is controlled by a control signal, to convert an input voltage Vin to an output voltage Vout which is supplied to the LED circuit 10. The remote control circuit 120 receives electrical power (supply voltage) from the voltage supply circuit 130, and generates the control signal according to a remote signal such as a radio frequency (RF) signal, a power line communication (PLC) signal or an infrared (IR) signal. The voltage supply circuit 130 converts the input voltage Vin to the supply voltage to supply electrical power to the remote control circuit 120.

The remote control circuit 120 should keep active even when the LED control circuit 110 is turned OFF the LED circuit 10, such that the remote control circuit 120 can receive the remote signal and generate a corresponding control signal during when the LED circuit 10 is OFF. To this end, the voltage supply circuit 130 should keep generating the supply voltage, such that the remote control circuit 120 can operate regardless whether the LED circuit 10 is ON or OFF. In the prior art LED driver circuit 100, the voltage supply circuit 130 receives the input voltage Vin and converts it to the supply voltage. However, the input voltage Vin is usually a relatively high voltage such as rectified power from 110V or 220V AC, so the supply voltage circuit 130 needs to be a circuit which is capable of sustaining the high input voltage, and because of safety regulation it often requires using a high voltage isolation structure which significantly increases the cost, and the circuit is more vulnerable because it operates in a high voltage environment.

To overcome the drawbacks in the prior art, the present invention proposes a light emitting device driver circuit and a control method wherein the voltage supply circuit has a relatively lower manufacturing cost; the voltage supply circuit can provide the supply voltage regardless whether the LED circuit is ON or OFF, but is not directly connected to the high input voltage Vin.

SUMMARY OF THE INVENTION

From one perspective, the present invention provides a light emitting device driver circuit, including: a light emitting device control circuit, for converting an input voltage to an output voltage according to a control signal and supplying the output voltage to a light emitting device circuit; a voltage supply circuit, which is coupled to the light emitting device circuit, for generating a supply voltage from the output voltage or a voltage related to the output voltage; and a remote control circuit, which is coupled to the voltage supply circuit, for receiving the supply voltage and generating the control signal according a remote signal, wherein when the light emitting device circuit is ON, the light emitting device control circuit regulates a current flowing through the light emitting device circuit, and when the light emitting device circuit is OFF, the light emitting device control circuit regulates the output voltage to a level sufficient for the voltage supply circuit to generate the supply voltage.

In one preferable embodiment, the supply voltage is generated directly from the output voltage.

In another preferable embodiment, the supply voltage is generated indirectly from a voltage related to the output voltage, wherein the voltage related to the output voltage for example is an auxiliary voltage generated by a winding of a transformer.

In one preferable embodiment, when the output voltage is larger than a first threshold voltage, the light emitting device circuit is turned ON, and when the output voltage is smaller than a second threshold voltage, the light emitting device circuit is turned OFF, wherein the first threshold voltage is not smaller than the second threshold voltage, and the output voltage or the voltage related to the output voltage is not smaller than the supply voltage.

In one preferable embodiment, when the output voltage is larger than a first threshold voltage, the light emitting device control circuit regulates an output current and supplies the output current to the light emitting device circuit, and when the output voltage is smaller than a second threshold voltage, the light emitting device control circuit regulates the output voltage or the voltage related to the output voltage to be not smaller than a predetermined voltage, wherein the first threshold voltage is not smaller than the second threshold voltage, and the predetermined voltage is not smaller than the supply voltage.

In the aforementioned embodiment, the voltage supply circuit preferably includes a linear regulator circuit or a low drop-out regulator (LDO) circuit.

In another preferable embodiment, the light emitting device control circuit is a non-isolated circuit, including: a power circuit, for converting the input voltage to the output voltage according to a regulation signal; a voltage sense circuit, which is coupled to the power circuit, for sensing the output voltage and generating a voltage sense signal; a voltage control circuit, which is coupled to the voltage sense circuit, for generating a voltage control signal according to the voltage sense signal; a current sense circuit, which is coupled to the light emitting device circuit, for sensing the current flowing through the light emitting device circuit and generating a current sense signal; a current control circuit, which is coupled to the current sense circuit, for generating a current control signal according to the current sense signal; and a selection circuit, which is coupled to the voltage control circuit and the current control circuit, for determining whether the regulation signal is generated according to a selection between the current control signal and the voltage control signal.

In the aforementioned embodiment, the light emitting device control circuit may further include a control signal analysis circuit, which is coupled to the remote control circuit, for generating a selection signal according to the control signal, wherein the selection signal is inputted to the selection circuit, so as to determine the regulation signal.

In the aforementioned embodiment, the control signal can be an enable signal, or an enable signal can be generated from the control signal, and the enable signal is sent to the current control circuit, so that the selection circuit is simplified as an adaptive selection circuit which selects the current control signal in higher priority to the voltage control signal.

In the aforementioned embodiment, the control signal can be an enable signal, or an enable signal can be generated from the control signal, and the enable signal is sent to the voltage control circuit, so that the selection circuit is simplified as an adaptive selection circuit which selects the voltage control signal in higher priority to the current control signal.

In one embodiment, the current control circuit is controllable by the control signal to generate the current control signal.

In another preferable embodiment, the light emitting device control circuit is an isolated circuit, including: a primary side circuit, for operating a power switch therein according to an regulation signal; a transformer circuit, for converting a primary side voltage which is related to the input voltage to the output voltage, the transformer circuit including: a primary side winding, which is coupled to the primary side voltage, and is controlled by the power switch of the primary side circuit; and a secondary side winding, which is coupled to the output voltage; a current sense circuit, for generating a current sense signal by sensing the current flowing through the light emitting device circuit; a current control circuit, which is coupled to the current sense circuit, for generating a current control signal according to the current sense signal; an opto-coupler driver circuit, which is coupled to the current control circuit, for generating an opto-coupler signal according to the current control signal when the light emitting device circuit is turned ON; and an opto-coupler circuit, which is coupled between the primary side circuit and the opto-coupler driver circuit, for generating the regulation signal according to the opto-coupler signal and transmitting the regulation signal to the primary side circuit.

In the aforementioned embodiment, the light emitting device control circuit may further include a voltage control circuit, for generating a voltage control signal according to the output voltage.

In the aforementioned embodiment, the light emitting device control circuit preferably further includes a voltage sense circuit, which is coupled to the secondary side winding, for sensing the output voltage and generating a voltage sense signal which is inputted to the voltage control circuit.

In the aforementioned embodiment, the light emitting device circuit may further include a selection circuit, for determining whether to generate an opto-coupler driver circuit control signal to control the opto-coupler driver circuit according to the current control signal or the voltage control signal.

In the aforementioned embodiment, the light emitting device control circuit may further include a control signal analysis circuit, which is coupled to the remote control circuit, for generating a selection signal to be inputted to the selection circuit according to the control signal, so as to determine the opto-coupler driver circuit control signal.

In the aforementioned embodiment, the control signal can be an enable signal, or an enable signal can be generated from the control signal, and the enable signal is sent to the current control circuit, so that the selection circuit is simplified as an adaptive selection circuit which selects the current control signal in higher priority to the voltage control signal.

In the aforementioned embodiment, the control signal can be an enable signal, or an enable signal can be generated from the control signal, and the enable signal is sent to the voltage control circuit, so that the selection circuit is simplified as an adaptive selection circuit which selects the voltage control signal in higher priority to the current control signal.

In one embodiment, the opto-coupler driver circuit can adaptively generate the opto-coupler signal according to the current control signal in higher priority to the voltage control signal, or generate the opto-coupler signal according to the voltage control signal in higher priority to the current control signal.

In one preferable embodiment, the secondary side winding may include a first winding and a second winding, wherein the first winding is coupled between the output voltage and the ground level, and the second winding is for sensing the output voltage to generate the voltage related to the output voltage.

In the aforementioned embodiment, the current control circuit is preferably coupled to the remote control circuit, so that it is controlled by the control signal to generate the current control signal.

In the aforementioned embodiment, the current sense circuit is preferably coupled between the light emitting device circuit and the output voltage or a ground level.

In the aforementioned embodiment, the opto-coupler driver circuit may further include an overdrive circuit, which is coupled to the remote control circuit, for overdriving the opto-coupler circuit when the light emitting device circuit is OFF, wherein when the opto-coupler driver circuit overdrives the opto-coupler circuit, the output voltage balances at a point wherein the light emitting device circuit is OFF and the output voltage or the voltage related to the output voltage is not smaller than the supply voltage.

From another perspective, the present invention provides a light emitting device driver circuit, including: a light emitting device control circuit, for converting an input voltage to an output voltage according to a control signal and supplying the output voltage to a light emitting device circuit, wherein the light emitting device control circuit is an isolated circuit, including: a transformer circuit, for converting the input voltage to the output voltage, the transformer circuit including: a primary side winding, which includes a first winding and a second winding; and a secondary side winding, which is coupled to the output voltage; and a primary side circuit, for operating a power switch therein according to the control signal to convert the input voltage to the output voltage; wherein the first winding is coupled to the input voltage and the power switch, and the second winding generates an auxiliary voltage according to the output voltage; a voltage supply circuit, which is coupled to the second winding, for generating a supply voltage from the auxiliary voltage; and a remote control circuit, which is coupled to the voltage supply circuit, for generating the control signal according to a remote signal, wherein the voltage supply circuit supplies the supply voltage to the remote control circuit, wherein when the light emitting device circuit is ON, the light emitting device control circuit regulates a current flowing through the light emitting device circuit, and when the light emitting device circuit is OFF, the light emitting device control circuit operates such that the auxiliary voltage is not smaller than the supply voltage.

In one preferable embodiment, the primary side circuit includes: a power switch, which is coupled to the first winding, for controlling the first winding according to a regulation signal to convert the input voltage to the output voltage; a current sense circuit, which is coupled to the power switch, for generating a current sense signal by sensing a current flowing through the power switch; a current control circuit, which is coupled to the current sense circuit, for generating a current control signal according to the current sense signal; a voltage control circuit, for generating a voltage control signal according to the auxiliary voltage; and a regulation signal generation circuit, which is coupled to the current control circuit and the voltage control circuit, for generating the regulation signal according to the current control signal or the voltage control signal. The primary side circuit may further includes a voltage sense circuit, which is coupled to the second winding, for generating a voltage sense signal by sensing the auxiliary voltage, and wherein the voltage control circuit generates the voltage control signal according to the voltage sense signal.

In the aforementioned embodiment, the voltage control circuit preferably includes: a reference voltage generation circuit, which is coupled to the remote control circuit, for generating a reference signal according to the control signal; and a comparison circuit, which is coupled to the voltage sense circuit and the reference voltage generation circuit, for generating the voltage control signal according to the voltage sense signal and the reference signal.

In another preferable embodiment, the voltage control circuit includes: a voltage sense signal adjustment circuit, which is coupled to the remote control circuit and the voltage sense circuit, for adjusting the voltage sense signal according to the control signal; and a comparison circuit, which is coupled to the voltage sense circuit, for generating the voltage control signal according to the voltage sense signal and a reference signal.

From another perspective, the present invention provides a control method of a light emitting device driver circuit, including: converting an input voltage to an output voltage according to a control signal and supplying the output voltage to a light emitting device circuit; generating a supply voltage from the output voltage or a voltage related to the output voltage; and supplying the supply voltage to a remote control circuit, and generating the control signal by the remote control circuit according to a remote signal, wherein when the output voltage is larger than a first threshold voltage, the light emitting device circuit is ON, and when the output voltage is smaller than a second threshold voltage, the light emitting device circuit is OFF, wherein the first threshold voltage is not smaller than the second threshold voltage, and when the light emitting device circuit is OFF, the output voltage or the voltage related to the output voltage is not smaller than the supply voltage.

In one preferable embodiment, the control method further includes: regulating a current flowing through the light emitting device circuit when the output voltage is larger than the first threshold voltage, and regulating the output voltage so that the output voltage or the voltage related to the output voltage is not smaller than the supply voltage when the output voltage is smaller than the second threshold voltage.

In the aforementioned embodiment, the step of converting an input voltage to an output voltage according to a control signal preferably includes: converting the input voltage to the output voltage according to a regulation signal which is determined by the control signal; generating a voltage sense signal by sensing the output voltage or the voltage related to the output voltage; generating a voltage control signal according to the voltage sense signal; generating a current sense signal by sensing a current flowing through the light emitting device circuit; generating a current control signal according to the current sense signal; and generating the regulation signal according to the voltage control signal or the current control signal.

In the aforementioned embodiment, the step of converting an input voltage to an output voltage according to a control signal preferably further includes: generating a selection signal according to the control signal to determine whether the regulation signal is generated according to the voltage control signal or the current control signal.

In the aforementioned embodiment, the step of converting an input voltage to an output voltage according to a control signal preferably further includes: generating an enable signal according to the control signal, to control the current control signal or the voltage control signal, wherein the enable signal can be the control signal itself or a signal generated from the control signal.

In the aforementioned embodiment, the step of converting an input voltage to an output voltage according to a control signal preferably includes: determining a regulation signal by the control signal, and controlling a transformer to converting the input voltage to the output voltage; generating a current sense signal by sensing a current flowing through the light emitting device circuit; generating a current control signal according to the current sense signal; generating an opto-coupler signal according to the current control signal when the light emitting device circuit is ON, and generating the regulation signal according to the opto-coupler signal.

In the aforementioned embodiment, the step of converting an input voltage to an output voltage according to a control signal may further include: generating a voltage control signal according to the output voltage for determining the opto-coupler signal when the light emitting device circuit is OFF.

In the aforementioned embodiment, the step of converting an input voltage to an output voltage according to a control signal may further include: deciding whether to generate an opto-coupler driver circuit control signal for determining the opto-coupler signal according to the current control signal or the voltage control signal.

In the aforementioned embodiment, the step of converting an input voltage to an output voltage according to a control signal to supply a light emitting device circuit may further include: overdriving an opto-coupler circuit when the light emitting device circuit is OFF, wherein the opto-coupler circuit is for generating the regulation signal. When the opto-coupler circuit is overdriven, the output voltage balances at a point wherein the light emitting device circuit is OFF and the output voltage or the voltage related to the output voltage is not smaller than the supply voltage.

From another perspective, the present invention provides a control method of a light emitting device driver circuit, including: determining an regulation signal according to a control signal, for controlling a transformer to convert an input voltage to an output voltage which is supplied to a light emitting device circuit, wherein the transformer has a primary side winding and a secondary side winding, and the primary side winding has a first winding and a second winding; generating a auxiliary voltage by the second winding according to the output voltage; generating a supply voltage from the auxiliary voltage; and supplying the supply voltage to a remote control circuit, and generating the control signal by the remote control circuit according to a remote signal, wherein when the output voltage is larger than a first threshold voltage, the light emitting device circuit is ON, and when the output voltage is smaller than a second threshold voltage, the light emitting device circuit is OFF, wherein the first threshold voltage is not smaller than the second threshold voltage, and when the light emitting device circuit is OFF, the auxiliary voltage is not smaller than the supply voltage.

The objectives, technical details, features, and effects of the present invention will be better understood with regard to the detailed description of the embodiments below.

BRIEF DESCRIPTION OF THE DRAWINGS

FIGS. 8A-8J show synchronous and asynchronous buck, boost, inverting, buck-boost, and inverting-boost converters as embodiments of a power circuit 311.

FIG. 9 shows a sixth embodiment of the present invention.

FIGS. 16A and 16B show a thirteenth embodiment of the present invention.

FIG. 17 shows a fourteenth embodiment of the present invention.

FIGS. 18A and 18B show characteristic curves of the relationships between an output current Iout and an opto-coupler current Iopt, and the opto-coupler current Iopt and an opto-coupler voltage Vopt respectively.

FIGS. 21A and 21B show a seventeenth embodiment of the present invention.

FIG. 22 shows an eighteenth embodiment of the present invention.

DESCRIPTION OF THE PREFERRED EMBODIMENTS

Figure 1:
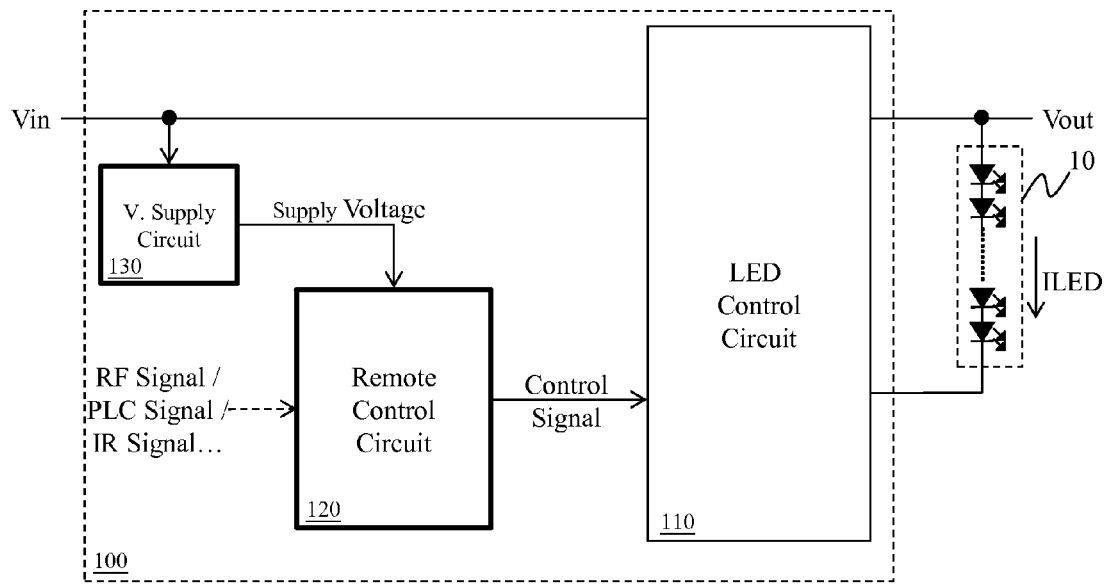
FIG. 1 shows a schematic diagram of a light emitting diode (LED) driver circuit 100.
Figure 2:
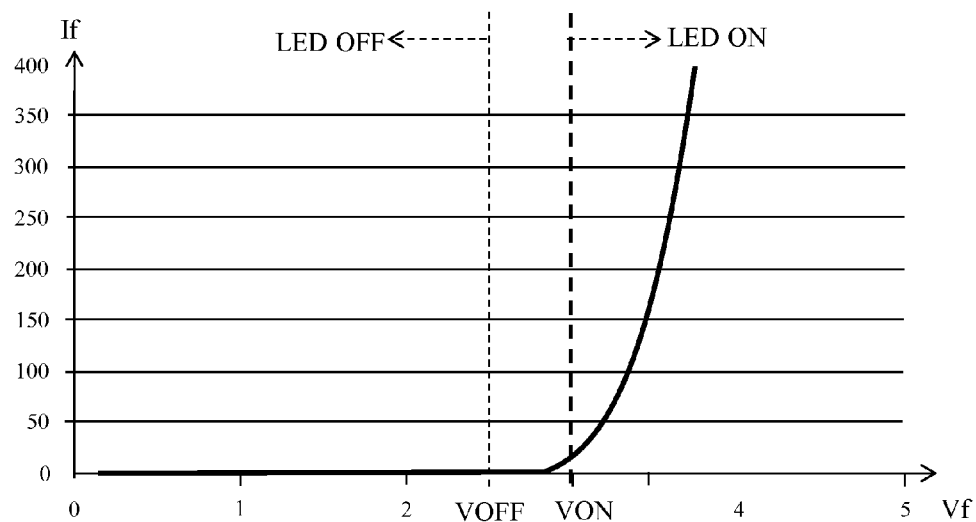
FIG. 2 shows a characteristic curve of the relationship between a forward current If and a forward voltage Vf of a typical LED, to illustrate a concept of the present invention.

FIG. 2 shows a characteristic curve of the relationship between a forward current If and a forward voltage Vf of a typical LED, to illustrate a concept of the present invention. As shown in the figure, when the forward voltage Vf applied to the LED is lower than a predetermined OFF voltage, for example but not limited to an OFF voltage VOFF as shown in the figure, the forward current If flowing through the LED is zero current or close to zero current, and in this case it is defined that the LED is turned OFF. When the forward voltage Vf applied to the LED is higher than a predetermined ON voltage, for example but not limited to an ON voltage VON as shown in the figure, the forward current If flowing through the LED is significantly higher, and in this case it is defined that the LED is turned ON. Note that, the application of the present invention is not limited to the LED circuit; the present invention is applicable to any light emitting device circuits with the aforementioned characteristics. In FIG. 2, it is shown that the ON voltage VON is not smaller than the OFF voltage VOFF, but the ON voltage VON and the OFF voltage VOFF are not limited to two different levels; they may be a same predetermined level, wherein the light emitting device circuit is turned ON when the forward voltage Vf is higher than the predetermined level, and the light emitting device circuit is turned OFF when the forward voltage Vf is lower than the predetermined level. The concept of the present invention is that, the remote control circuit is not directly connected to the relatively higher input voltage, but to a relative lower voltage, to improve the drawbacks of the prior art. The relative lower voltage for example comes from a single or a sum of plural forward voltages Vf of the LEDs (or a voltage related to this sum of the forward voltages, such as a voltage taken from an auxiliary winding, to be explained later), as the power source of the remote control circuit. When the forward voltage Vf is lower than the OFF voltage VOFF, the LED circuit is turned OFF, but the sum of the forward voltages Vf (or a voltage related to this sum) may be provided to a voltage supply circuit in a light emitting device driver circuit for generating a supply voltage to the remote control circuit.

Figure 3A:
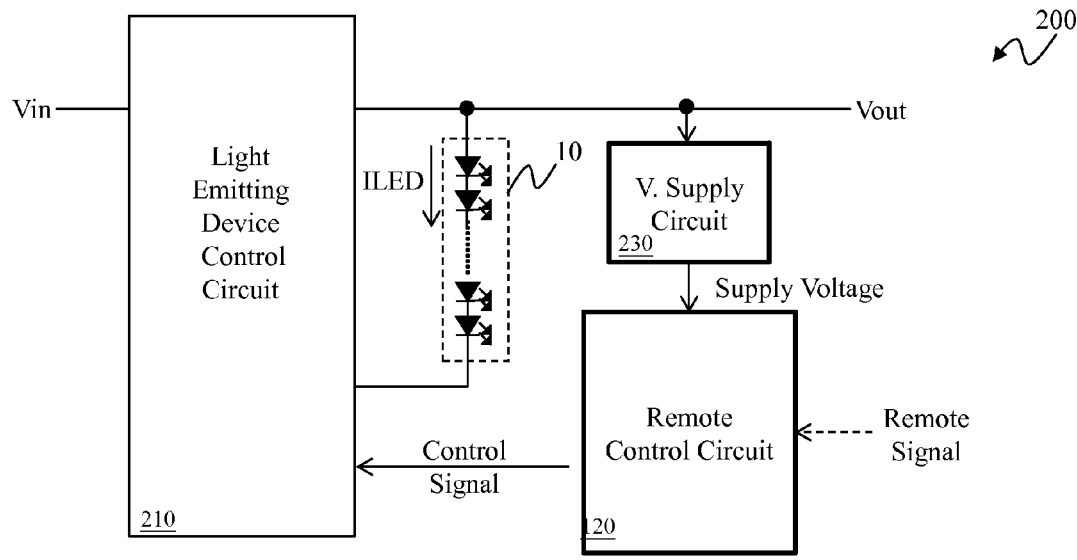
FIGS. 3A and 3B shows a first embodiment of the present invention.
Figure 3B:
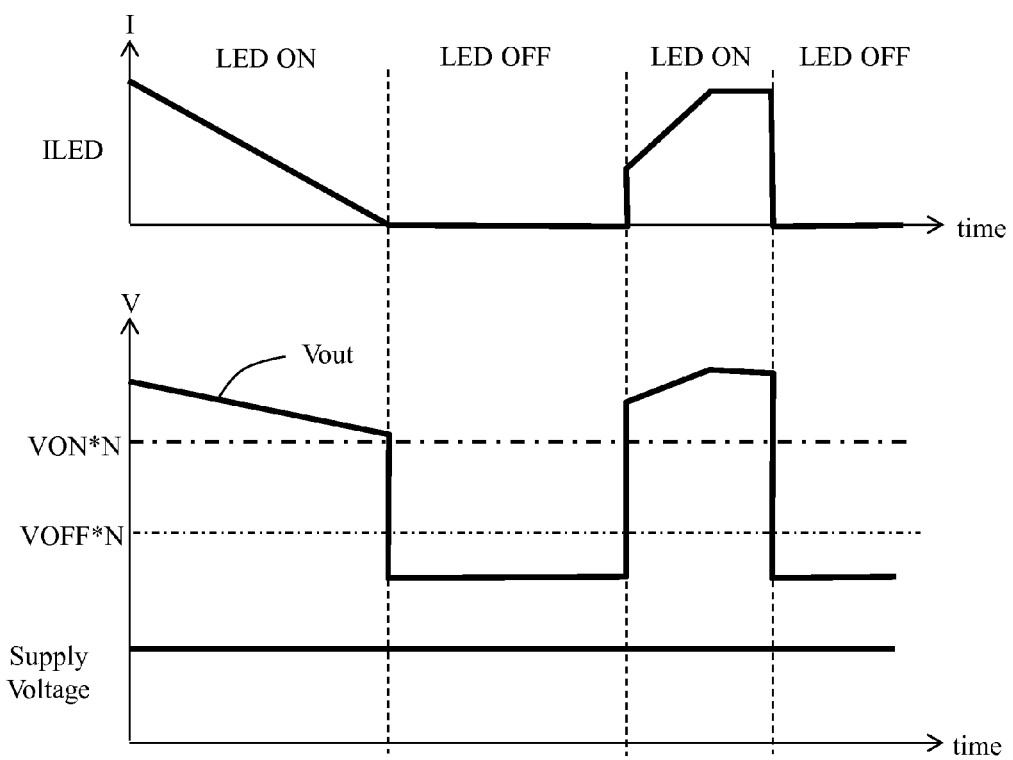

FIGS. 3A and 3B show a first embodiment of the present invention. As shown in FIG. 3A, a light emitting device driver circuit 200 includes a light emitting device control circuit 210, a voltage supply circuit 230, and a remote control circuit 120. The light emitting device control circuit 210 converts the input voltage Vin to the output voltage Vout according to a control signal and supplies the output voltage Vout to a light emitting device circuit. The light emitting device circuit is for example but not limited to the LED circuit 10 as shown in the figure. In one embodiment, The light emitting device driver circuit 200 turns ON the LED circuit 10 by controlling the output voltage Vout; when the output voltage Vout is higher than the LED ON voltage VON multiplied by a number N of the LEDs connected in series, the LED circuit 10 is turned ON. The voltage supply circuit 230 is coupled to the LED circuit 10, and it generates a supply voltage from the output voltage. The remote control circuit 120 is coupled to the voltage supply circuit 230 for receiving the supply voltage, and it generates the control signal according a remote signal. The remote signal is for example but not limited to an RF signal, a PLC signal or an IR signal. The control signal is for example a simple enable signal, or in a more sophisticated form wherein it may include other control information such as but not limited to information relating to LED dimming control (brightness control).

FIG. 3B shows a schematic diagram of signal waveforms of an LED current ILED, the output voltage Vout, and the supply voltage. As shown in FIG. 3B, when the output voltage Vout is larger than the ON voltage VON multiplied by the number N of the LEDs connected in series of the LED circuit 10 (Vout>VON*N), the LED circuit 10 is turned ON, i.e., the LED current ILED is significantly larger than zero. When the output voltage Vout is smaller than the OFF voltage VOFF multiplied by the number N of the LEDs connected in series of the LED circuit 10 (Vout<VON*N), the LED circuit 10 is turned OFF, i.e., the LED current ILED is zero or close to zero. The ON voltage VON is not smaller than the OFF voltage VOFF. In a preferable embodiment, the output voltage Vout is maintained not smaller than the supply voltage regardless whether the LED is turned ON or OFF, such that the output voltage Vout may be used to supply electric power to the remote control circuit 120, i.e., the output voltage Vout may be used to generate the supply voltage, so that the remote control circuit 120 may keep operating. The voltage supply circuit 230 for example may include a low drop-out regulator (LDO) circuit to convert the output voltage Vout to the stable supply voltage which is supplied to the remote control circuit 120. Note that the LED circuit 10 is not limited to a single string of LEDs; it may include an LED array in any arrangement.

In a preferable embodiment, when it is required to turn ON the LED circuit 10, the regulation target of the light emitting device control circuit 210 is the LED current ILED, wherein the light emitting device control circuit 210 regulates the LED current ILED at a predetermined current by controlling the output voltage Vout to be larger than the ON voltage VON multiplied by the number N of the LEDs connected in series of the LED circuit 10; when it is required to turn OFF the LED circuit 10, the regulation target of the light emitting device control circuit 210 is the output voltage Vout, wherein the light emitting device control circuit 210 regulates the output voltage Vout at a predetermined voltage which is smaller than the OFF voltage VOFF multiplied by the number N of the LEDs connected in series of the LED circuit 10. The ON or OFF state of the LED circuit may be a continuous state wherein the user's intention is to turn ON or OFF the LED circuit, or may be an alternating state wherein the user's intention is to adjust the brightness of the LED circuit by pulse width modulation (PWM) dimming.

Note that, in describing that "the output voltage Vout is larger than the ON voltage VON", the term "larger" is correlated to the electric polarity of the output voltage Vout. For example, when the output voltage vout is a positive voltage, the sentence "the output voltage Vout is larger than the ON voltage VON multiplied by the number N" means that the positive output voltage Vout is higher than the ON voltage VON multiplied by the number N; when the output voltage Vout is a negative voltage, the sentence "the output voltage Vout is larger than the ON voltage VON multiplied by the number N" means that the absolute value of the negative output voltage Vout is higher than the absolute value of the negative the ON voltage VON multiplied by the number N. The above is applicable to the other larger/smaller and higher/lower relationships described in this specification.

Figure 4:
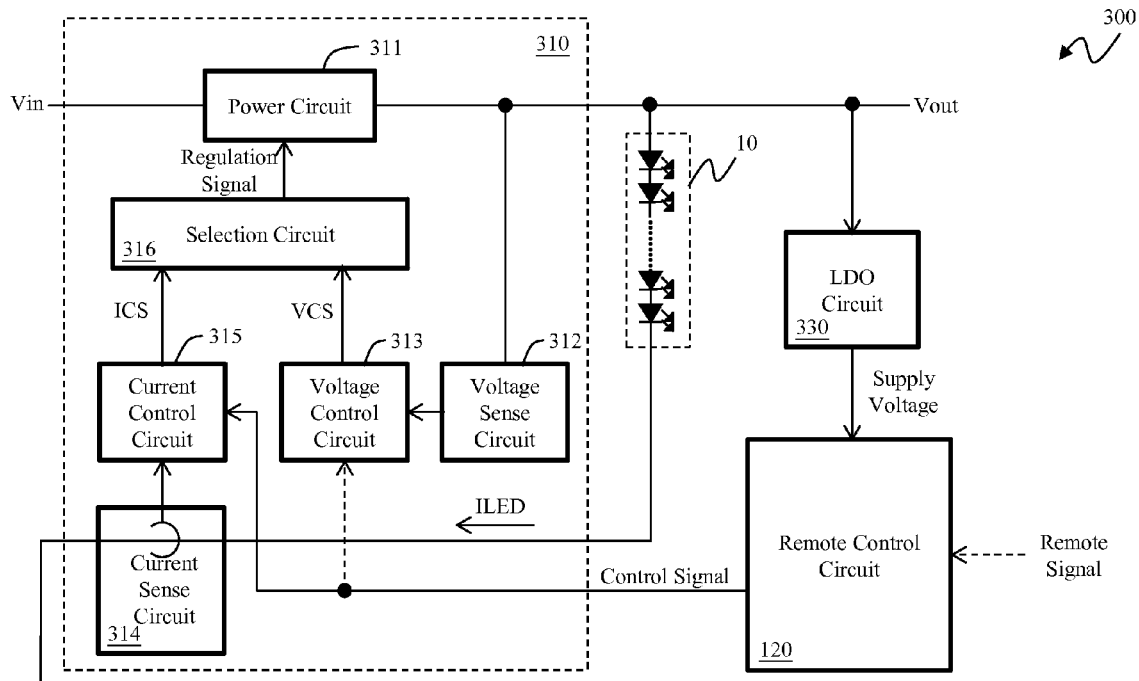
FIG. 4 shows a second embodiment of the present invention.

FIG. 4 shows a second embodiment of the present invention. As shown in FIG. 4, a light emitting device driver circuit 300 includes a light emitting device control circuit 310, an LDO circuit 330, and a remote control circuit 120. The light emitting device control circuit 310 converts the input voltage Vin to the output voltage Vout according to a control signal and supplies the output voltage to the light emitting device circuit. The light emitting device circuit is for example but not limited to the LED circuit 10. The control signal includes for example but not limited to a conduction signal which determines ON or OFF of the LED circuit 10 and/or a dimming signal which determines the brightness of the LED circuit 10. In this embodiment, the light emitting device control circuit 310 is for example but not limited to a non-isolated circuit, which includes: a power circuit 311, a voltage sense circuit 312, a voltage control circuit 313, a current sense circuit 314, a current control circuit 315, and a selection circuit 316. The power circuit 311 operates at least one power switch therein according to a regulation signal to convert the input voltage Vin to the output voltage Vout. The power circuit 311 may be any one of synchronous and asynchronous buck, boost, inverting, buck-boost, and inverting-boost converters as shown in FIGS. 8A-8J. The voltage sense circuit 312 is coupled to the power circuit 311, for generating a voltage sense signal by sensing the output voltage Vout. The voltage control circuit 313 is coupled to the voltage sense circuit 312, for generating a voltage control signal VCS according to the voltage sense signal. The current sense circuit 314 is coupled to the LED circuit 10, for generating a current sense signal by sensing the LED current ILED flowing through the LED circuit 10. The current control circuit 315 is coupled to the current sense circuit 314, for generating a current control signal ICS according to the current sense signal. The selection circuit 316 is coupled to the voltage control circuit 313 and the current control circuit 315, for generating the regulation signal according to the voltage control signal VCS and/or the current control signal ICS.

The selection circuit 316 can operate for example in a controlled selection mode or an adaptive selection mode. In the controlled selection mode, the selection circuit 316 selects the voltage control signal VCS or the current control signal ICS as the regulation signal according to a selection signal. For example, the selection signal may be a control signal generated by the remote control circuit 120 (or a signal related to the control signal), or any signal in the circuitry which can indicate the ON or OFF state of the LED circuit 10. In the adaptive selection mode, the selection circuit 316 generates the regulation signal according to the status of the voltage control signal VCS or the current control signal ICS, and determines whether to regulate the output voltage Vout or the LED current ILED. For example, when the current control signal ICS indicates that the LED current ILED should be regulated (or the LEDs should be turned ON), the selection circuit 316 generates the regulation signal according to the current control signal ICS. On the other hand, when the current control signal ICS indicates that it is not required to regulate the LED current ILED (or the LEDs should be turned OFF), the selection circuit 316 generates the regulation signal according to the voltage control signal VCS. This is an adaptive selection mode which selects the current control signal ICS in higher priority to the voltage control signal VCS; certainly, the circuit can be arranged in an opposite way so that the adaptive selection mode selects the voltage control signal VCS in higher priority to the current control signal ICS. In the aforementioned adaptive selection mode, the selection circuit 316 may simply be a node, and the levels of the voltage control signal VCS and the current control signal ICS may be properly arranged to achieve the aforementioned control mechanism. For example, the voltage of the node at which the selection circuit 316 is located may be determined by a higher one of the voltage control signal VCS and the current control signal ICS, and when it is required to regulate the LED current ILED, the level of the current control signal ICS is higher than the level of the voltage control signal VCS; when it is not required to regulate the LED current ILED, the level of the voltage control signal VCS is higher than the level of the current control signal ICS (this will be further illustrated by an embodiment with reference to FIG. 16A). Or, the voltage of the node at which the selection circuit 316 is located may be determined by a lower one of the voltage control signal VCS and the current control signal ICS, and when it is required to regulate the LED current ILED, the level of the current control signal ICS is lower than the level of the voltage control signal VCS; when it is not required to regulate the LED current ILED, the level of the voltage control signal VCS is lower than the level of the current control signal ICS (this will be further illustrated by an embodiment with reference to FIG. 16B). Thus, the selection circuit 316 may select the voltage control signal VCS or the current control signal ICS adaptively. Certainly, any other method capable of achieving the result "when the current control signal ICS indicates that the LED current ILED should be regulated, the selection circuit 316 generates the regulation signal according to the current control signal ICS, and when the current control signal ICS indicates that it is not required to regulate the LED current ILED, the selection circuit 316 generates the regulation signal according to the voltage control signal VCS" also is applicable and should fall within the scope of the present invention.

Still referring to FIG. 4, because the selection circuit 316 can operate in an adaptive selection mode, the control signal issued by the remote control circuit 120 can be sent to control only one of the voltage control circuit 313 or the current control circuit 315 (shown by thick dash line and thin solid line respectively). That is, when the control signal only controls the voltage control circuit 313, if the remote control circuit 120 issues the control signal to control the voltage control circuit 313 (or enables the voltage control circuit 313), then the selection circuit 316 adaptively selects the voltage control signal VCS as the regulation signal, and if the remote control circuit 120 does not issue the control signal to control the voltage control circuit 313 (or disables the voltage control circuit 313), then the selection circuit 316 adaptively selects the current control signal ICS as the regulation signal. On the other hand, when the control signal only controls the current control circuit 315, if the remote control circuit 120 issues the control signal to control the current control circuit 315 (or enables the current control circuit 315), then the selection circuit 316 adaptively selects the current control signal ICS as the regulation signal, and if the remote control circuit 120 does not issue the control signal to control the current control circuit 315 (or disables the current control circuit 315), then the selection circuit 316 adaptively selects the voltage control signal VCS as the regulation signal. However, if the control signal issued by the remote control circuit 120 is not only an ON/OFF signal but also has an analog dimming function (to adjust the current through the LEDs by an analog manner), then it is preferred for the control signal to control the current control circuit 315, so that the current control signal ICS can be adjusted to correspondingly adjust the current through the LEDs, and this is why the control signal is shown to be transmitted to the current control circuit 315 by the solid line in the figure. Note that, what is described in the above to control only one of the voltage control circuit 313 or the current control circuit 315 by the control signal issued by the remote control circuit 120 is only one of the embodiments of the present invention; it certainly falls within the scope of the present invention to control both of the voltage control circuit 313 and the current control circuit 315 by the control signal. In addition, the dimming control is not limited to analog dimming, but can be PWM dimming. PMW dimming is to intermittently turn ON or enable the current control circuit 315, so as to control an average current of the LEDs. Apparently, all of the above control mechanisms (to control only the voltage control circuit 313, to control only the current control circuit 315, or to control them both) can achieve PWM dimming.

Figure 5:
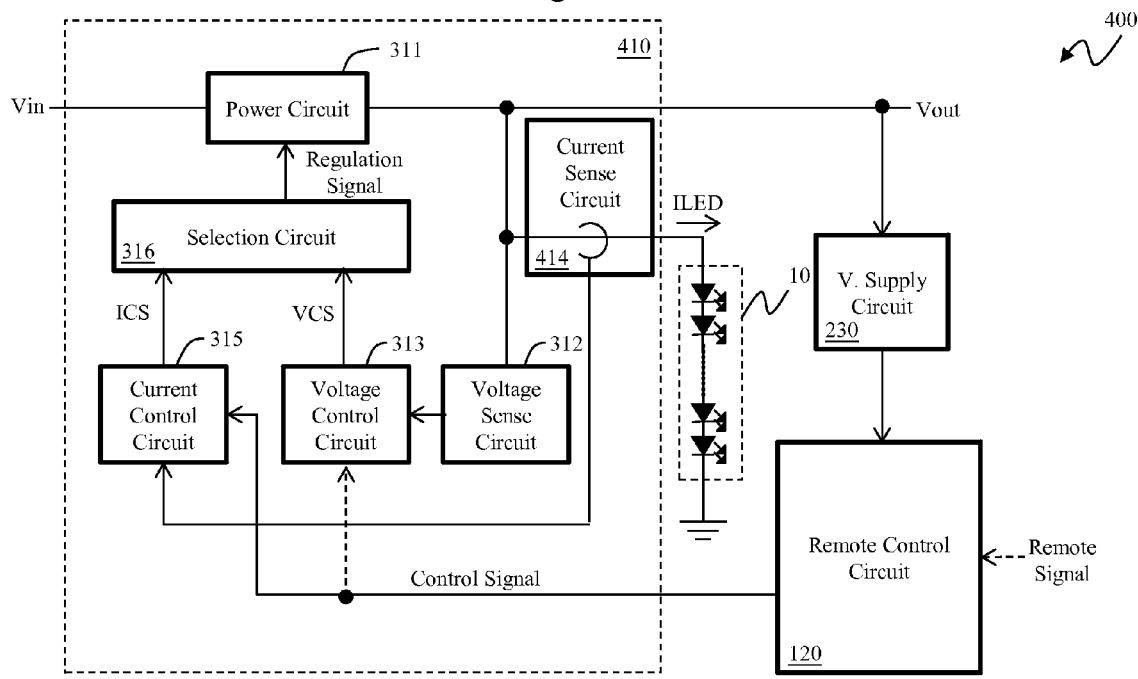
FIG. 5 shows a third embodiment of the present invention.

FIG. 5 shows a third embodiment of the present invention. As shown in FIG. 5, a light emitting device driver circuit 400 includes a light emitting device control circuit 410, a voltage supply circuit 230, and a remote control circuit 120. The light emitting device control circuit 410 converts the input voltage Vin to the output voltage Vout according to the control signal and supplies the output voltage Vout to the light emitting device circuit. The light emitting device circuit is for example but not limited to the LED circuit 10. This embodiment is different from the second embodiment in that, in this embodiment, a current sense circuit 414 is coupled between the output voltage Vout and a forward terminal of the LED circuit 10, while in the second embodiment, the current sense circuit 314 is coupled between a reverse terminal of the LED circuit 10 and the ground level.

Figure 6:
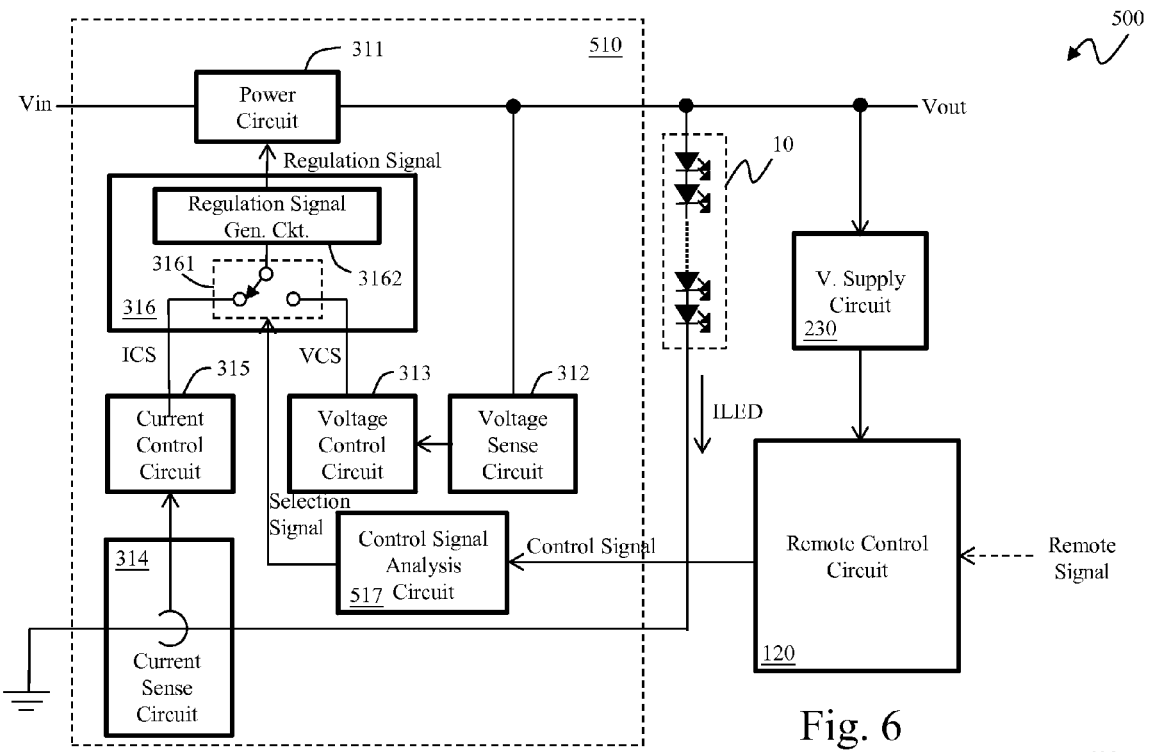
FIG. 6 shows a fourth embodiment of the present invention.

FIG. 6 shows a fourth embodiment of the present invention. As shown in FIG. 6, a light emitting device driver circuit 500 includes a light emitting device control circuit 510, a voltage supply circuit 230, and a remote control circuit 120. This embodiment is different from the second embodiment in that, in this embodiment, the light emitting device control circuit 510 further includes a control signal analysis circuit 517, which is coupled to the remote control circuit 120, for generating a selection signal 316 according to the control signal and sending the selection signal 316 to the selection circuit, so as to determine the regulation signal. The selection circuit 316 determines whether it outputs the voltage control signal VCS or the current control signal ICS as the regulation signal to the power circuit 311 according to the selection signal. As shown in the figure, the selection circuit 316 for example includes a selection switch circuit 3161 (or an equivalent circuit) and a regulation signal generation circuit 3162, wherein the selection switch circuit 3161 determines whether the voltage control signal VCS or the current control signal ICS is selected to be inputted to the regulation signal generation circuit 3162 according to the selection signal, so that the regulation signal is generated correspondingly.

Figure 7:
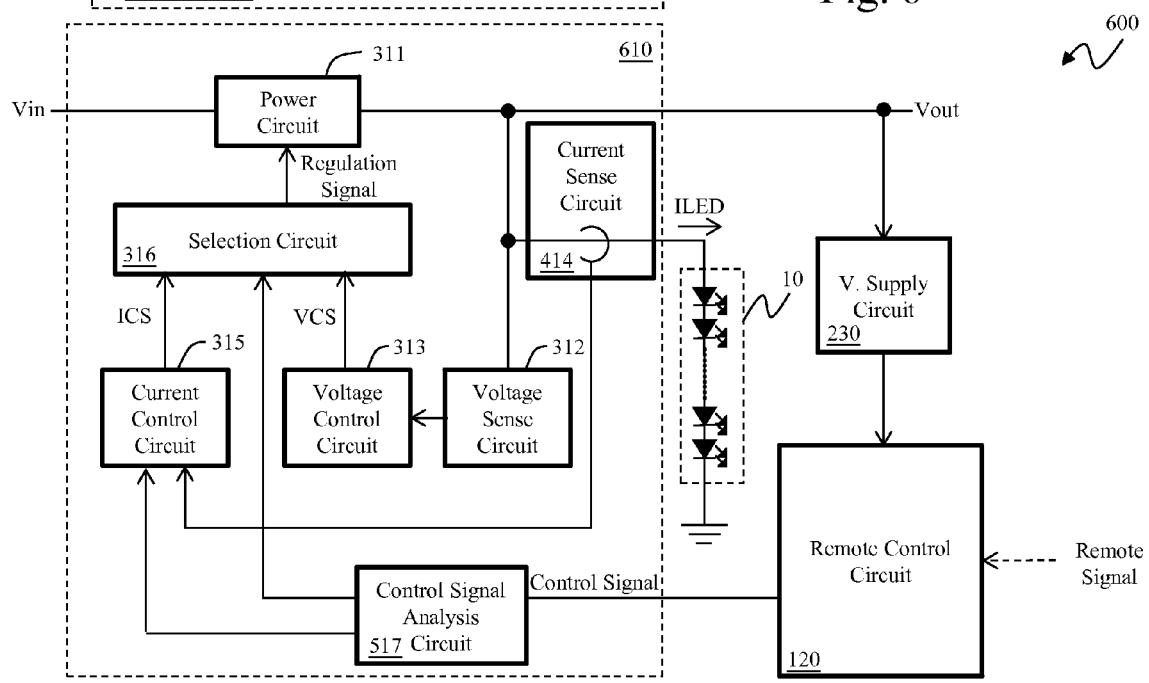
FIG. 7 show a fifth embodiment of the present invention.
Figure 8A:
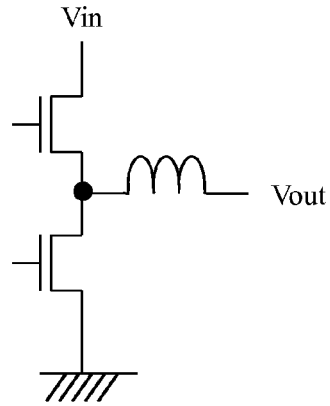
Figure 8B:
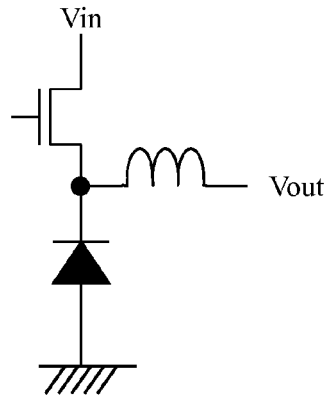
Figure 8C:
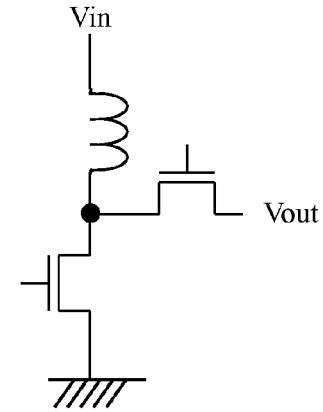
Figure 8D:
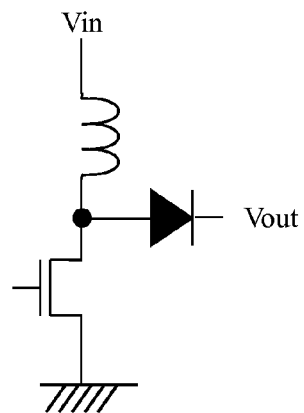
Figure 8E:
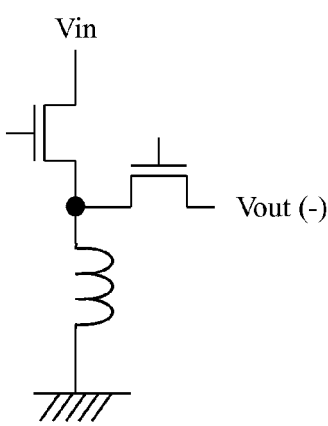
Figure 8F:
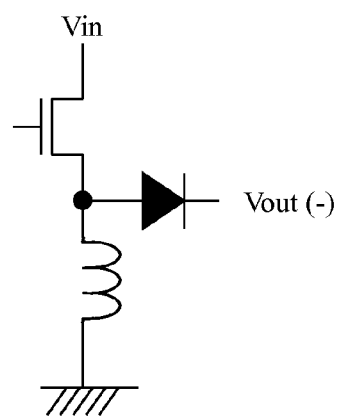
Figure 8G:
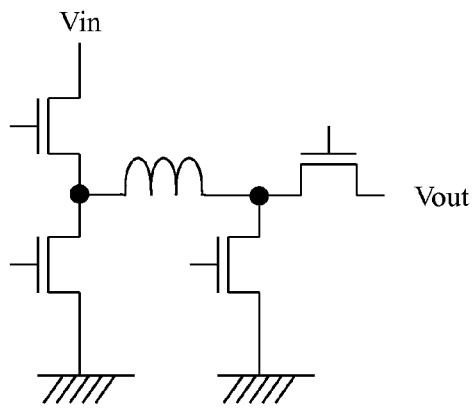
Figure 8H:
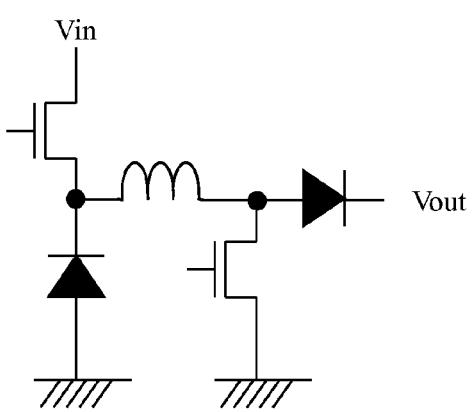

FIG. 7 shows a fifth embodiment of the present invention. As shown in FIG. 7, a light emitting device driver circuit 600 includes a light emitting device control circuit 610, a voltage supply circuit 230, and a remote control circuit 120. This embodiment is different from the fourth embodiment in that, in this embodiment, the current sense circuit 414 is coupled between the power circuit 311 and the forward terminal of the LED circuit 10, while in the fourth embodiment, the current sense circuit 314 is coupled between the reverse terminal of the LED circuit 10 and the ground level.

FIG. 9 shows a sixth embodiment of the present invention. As shown in FIG. 9, a light emitting device driver circuit 700 includes a light emitting device control circuit 710, a voltage supply circuit 230, and a remote control circuit 120. The light emitting device control circuit 710 converts the input voltage Vin to the output voltage Vout according to the control signal and supplies the output voltage Vout to the light emitting device circuit. The light emitting device circuit is for example but not limited to the LED circuit 10. The control signal includes for example but not limited to a conduction signal which determines ON or OFF of the LED circuit 10 and/or a dimming signal which determines the brightness of the LED circuit 10. In this embodiment, the light emitting device control circuit 710 is for example but not limited to an isolated circuit, which includes: a primary side circuit 711, a voltage sense circuit 712, a voltage control circuit 713, a current sense circuit 714, a current control circuit 715, a transformer circuit 717, an opto-coupler driver circuit 718, and an opto-coupler circuit 719. The primary side circuit 711 operates a power switch (not shown in this figure for simplicity, but will be shown later in another embodiment) according to an regulation signal to control the transformer circuit 717 to convert a primary side voltage to the output voltage Vout. For example, if the input voltage Vin is an AC voltage, the primary side voltage may be a rectified voltage of the AC voltage. For another example, if the input voltage Vin is already a rectified voltage, the primary side voltage may be the input voltage Vin itself or a function of it. The transformer circuit 717 has a primary side winding 7171 and a secondary side winding 7172. The primary side winding 7171 is coupled to the primary side voltage, and is controlled by the power switch of the primary side circuit 711. The secondary side winding 7172 is coupled between the output voltage Vout and the ground level. The secondary side winding 7172 converts the primary side voltage to the output voltage Vout in response to the operation of the primary side winding 7171. The current sense circuit 714 is coupled to the LED circuit 10 for generating the current sense signal by sensing the LED current ILED flowing through the LED circuit 10. The current control circuit 715 is coupled to the current sense circuit 714 for generating the current control signal ICS according to the current sense signal. The voltage sense circuit 712 is coupled to the secondary side winding 7172, for generating the voltage sense signal by sensing the output voltage Vout. The voltage control circuit 713 is coupled to the voltage sense circuit 712, for generating the voltage control signal VCS according to the voltage sense signal. The opto-coupler driver circuit 718 is coupled to for example the current control circuit 715 and the voltage control circuit 713, for generating an opto-coupler signal according to the current control signal ICS and/or the voltage control signal VCS. The opto-coupler circuit 719 is coupled between the primary side circuit 711 and the opto-coupler driver circuit 718, for generating a regulation signal according to the opto-coupler signal to be inputted to the primary side circuit 711. In this embodiment, the opto-coupler driver circuit 718 operates in for example but not limited to the adaptive selection mode. When the current control signal ICS itself indicates that the LED current ILED should be regulated, the opto-coupler circuit 719 generates the regulation signal according to the current control signal ICS. On the other hand, when the current control signal ICS indicates that it is not required to regulate the LED current ILED, the opto-coupler circuit 719 generates the regulation signal according to the voltage control signal VCS. It can be viewed as if the opto-coupler driver circuit 718 is located at or coupled to a node, and the node is coupled to the current control circuit 715 and the voltage control circuit 713; the node corresponds to an adaptive selection circuit. Because the opto-coupler feedback in the isolated circuit is usually designed as negative feedback (i.e., when the level of the feedback signal is relatively high, the output voltage is regulated downward, and when the level of the feedback signal is relatively low, the output voltage is regulated upward), the voltage at the node where the opto-coupler driver circuit 718 is located at or coupled to may be determined by a signal with a lower level. However certainly, the opto-coupler driver circuit 718 can be coupled to a selection circuit and receives the current control signal ICS and/or the voltage control signal VCS through the selection circuit (an example is shown in the next embodiment).

Figure 10:
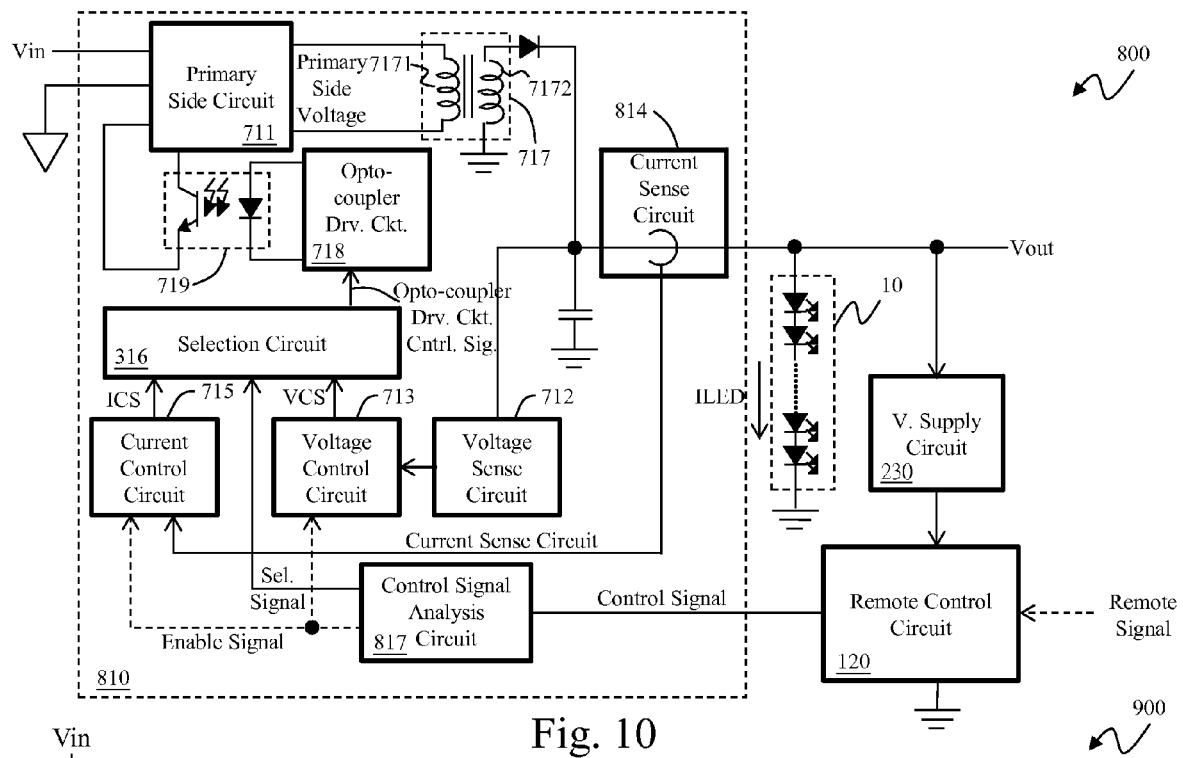
FIG. 10 shows a seventh embodiment of the present invention.

FIG. 10 shows a seventh embodiment of the present invention. As shown in FIG. 10, a light emitting device driver circuit 800 includes a light emitting device control circuit 810, a voltage supply circuit 230, and a remote control circuit 120. The light emitting device control circuit 810 converts the input voltage Vin to the output voltage Vout according to the control signal and supplies the output voltage Vout to the light emitting device circuit. The light emitting device circuit is for example but not limited to the LED circuit 10. This embodiment is different from the sixth embodiment in that, in this embodiment, a current sense circuit 714 is coupled between the output voltage Vout and a forward terminal of the LED circuit 10, while in the sixth embodiment, the current sense circuit 714 is coupled between a reverse terminal of the LED circuit 10 and the ground level. Besides, the light emitting device control circuit 810 in this embodiment further includes the selection circuit 316, which is coupled to the current control circuit 715 and the voltage control circuit 713, for generating a driver circuit control signal according to the current control signal ICS and/or the voltage control signal VCS and sending the driver circuit control signal to the opto-coupler driver circuit 718. Furthermore, the light emitting device control circuit 810 further includes a control signal analysis circuit 817, which is coupled to the remote control circuit 120, for generating the selection signal according to the control signal and sends the selection signal to the selection circuit 316, so as to determine the opto-coupler signal. In addition to the above, the control signal analysis circuit 817 may (but does not have to) further generate an enable signal according to the control signal, to enable or disable the current control circuit 715 and/or the voltage control circuit 713, as in the adaptive selection mode (in this case, the selection signal is not required). Either the selection signal or the enable signal can serve as a PWM dimming signal for adjusting the brightness of the LED circuit 10 by intermittently turning on the LED circuit 10 to control its average current.

Figure 11:
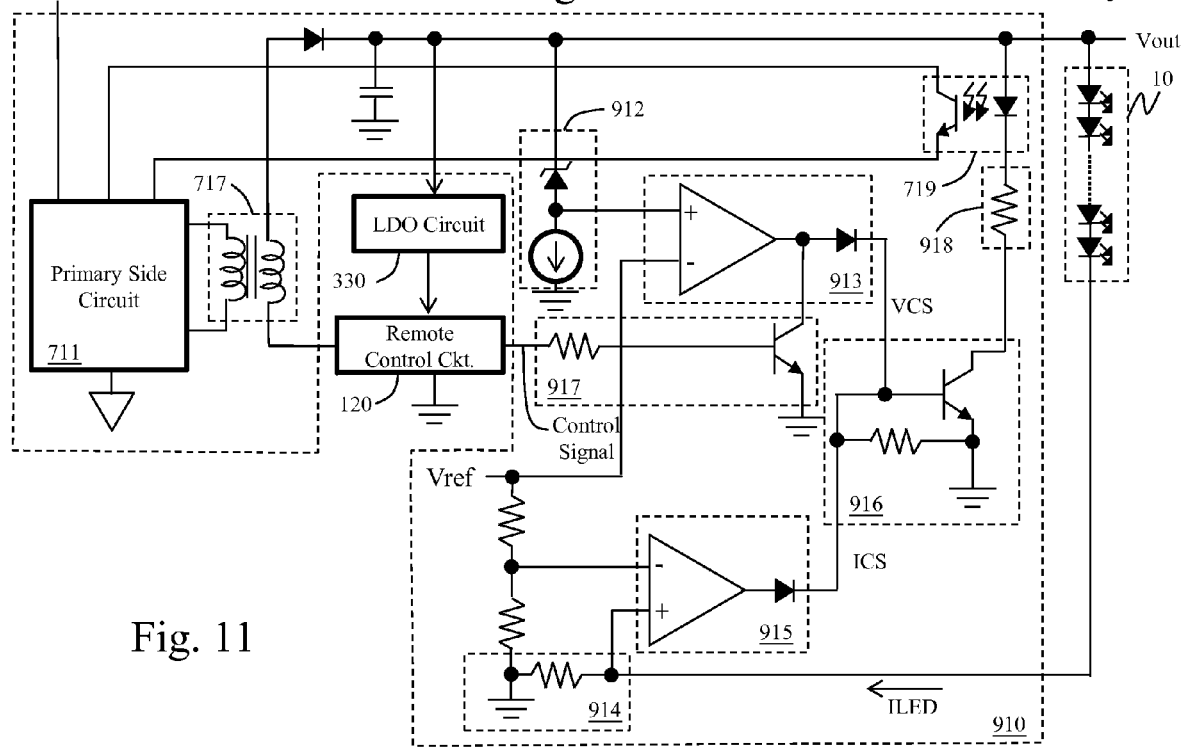
FIG. 11 shows an eighth embodiment of the present invention.

FIG. 11 shows an eighth and a more specific embodiment of the present invention. As shown in FIG. 11, a light emitting device driver circuit 900 includes a light emitting device control circuit 910, an LDO circuit 330, and a remote control circuit 120. The light emitting device control circuit 910 converts the input voltage Vin to the output voltage Vout according to the control signal and supplies the output voltage Vout to the light emitting device circuit. The light emitting device circuit is for example but not limited to the LED circuit 10. In this embodiment, the light emitting device control circuit 910 is for example but not limited to an isolated circuit, which includes: a primary side circuit 711, a voltage sense circuit 912, a voltage control circuit 913, a current sense circuit 914, a current control circuit 915, a selection circuit 916, a transformer circuit 717, a control signal analysis circuit 917, an opto-coupler driver circuit 918, and an opto-coupler circuit 719. The current sense circuit 914 is for example but not limited to a resistor as shown in the figure, which is coupled to the LED circuit 10, and generates the current sense signal according to a voltage drop across the resistor as the LED current ILED flows through; the current sense signal is sent to an input terminal of a comparison circuit in the current control circuit 915. (In the context of the present invention, the term "comparison circuit" is used in a broad sense, which may be an analog differential amplifier or a digital comparator, depending on how its output is to be processed). The comparison circuit of the current control circuit 915 compares the current sense signal with a first reference signal related to a reference voltage Vref, and generates the current control signal ICS according to the comparison result. The voltage sense circuit 912 generates the voltage sense signal according to the output voltage Vout and sends the voltage sense signal to the voltage control circuit 913. The voltage control circuit 913 for example includes a comparison circuit as shown in the figure, which compares the voltage sense signal with a second reference signal related to the reference signal Vref, and generates the voltage control signal VCS. The selection circuit 916 includes for example but not limited to a transistor as shown in the figure, which has a base for receiving the current sense signal and the voltage sense signal VCS. The transistor operates by the adaptive selection mode; it generates different drain currents according to the current control signal ICS or the current control signal ICS as the opto-coupler driver circuit control signal, to be inputted to the opto-coupler driver circuit 918. The opto-coupler driver circuit 918 includes for example but not limited to a resistor as shown in the figure. The opto-coupler circuit 719 generates a regulation signal which is inputted to the primary side circuit 711 according to different drain currents flowing through the resistor. Note that the details of the circuit are only illustrative but not limiting. It is shown that the first reference signal and the second reference signal are both related to the reference signal Vref, which is only one among many possible embodiments. The first reference signal and the second reference signal can be set separately (not related to the same reference signal Vref). For another example, the voltage sense circuit 912 can be a resistor divider circuit instead of the circuit shown in the figure.

Figure 12A:
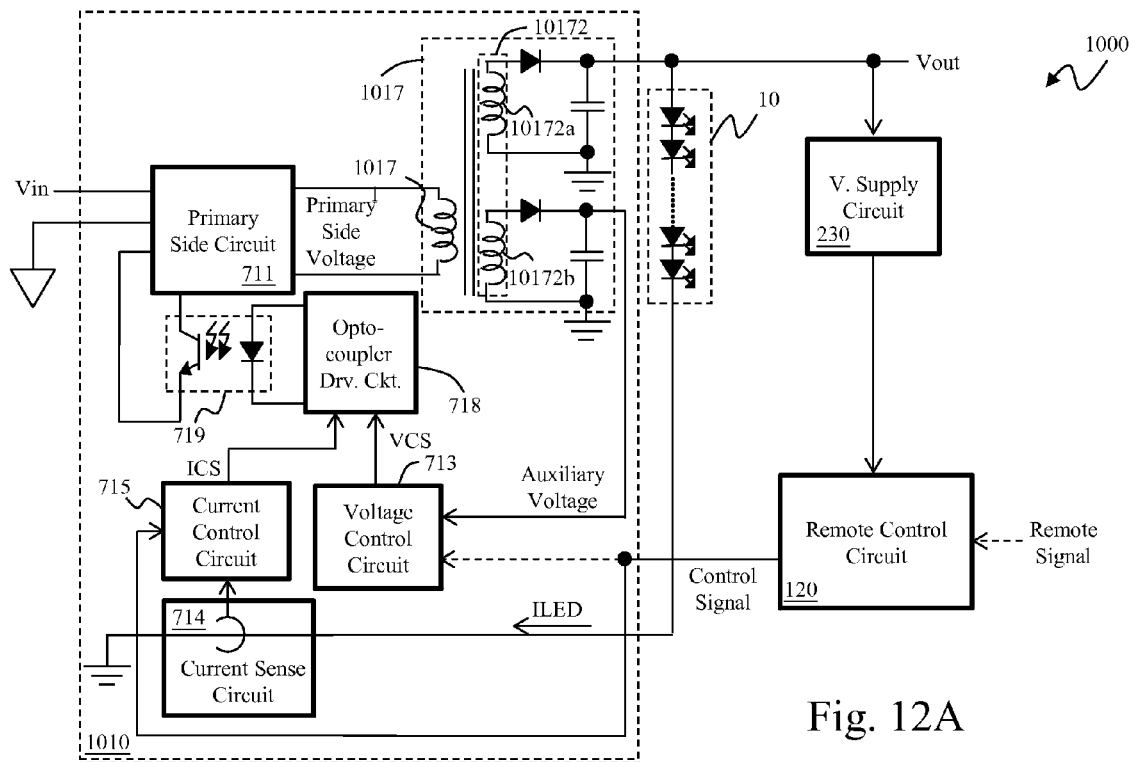
FIGS. 12A and 12B show two different structures of a ninth embodiment of the present invention.

FIG. 12A shows a ninth embodiment of the present invention. As shown in FIG. 12A, a light emitting device driver circuit 1000 includes a light emitting device control circuit 1010, a voltage supply circuit 230, and a remote control circuit 120. The light emitting device control circuit 1010 converts the input voltage Vin to the output voltage Vout according to the control signal and supplies the output voltage Vout to the light emitting device circuit. The light emitting device circuit is for example but not limited to the LED circuit 10. In this embodiment, the light emitting device control circuit 1010 is for example but not limited to isolated circuit, which includes: a primary side circuit 711, a voltage control circuit 713, a current sense circuit 714, a current control circuit 715, a transformer circuit 1017, an opto-coupler driver circuit 718, and an opto-coupler circuit 719. The primary side circuit 711 operates a power switch (not shown in this figure for simplicity, but will be shown later in another embodiment) according to the regulation signal to control the transformer circuit 1017 to convert a primary side voltage to the output voltage Vout. The transformer circuit 1017 has a primary side winding 10171 and a secondary side winding 10172. The primary side winding 10171 is coupled to the primary side voltage, and is controlled by the primary side circuit 711. The secondary side winding 10172 is coupled between the output voltage Vout and the ground level. The secondary side winding 10172 converts the primary side voltage to the output voltage Vout in response to the operation of the primary side winding 10171. The secondary side winding 10172 includes a first winding 10172a and a second winding 10172b. The first winding 10172a is coupled between the output voltage Vout and the ground level, and the second winding 10172b is for generating a voltage related to the output voltage Vout (referred to as the auxiliary voltage hereinafter). The current sense circuit 714 is coupled to the LED circuit 10 for generating the current sense signal by sensing the LED current ILED flowing through the LED circuit 10. The current control circuit 715 is coupled to the current sense circuit 714 for generating the current control signal ICS according to the current sense signal. The voltage control circuit 713 is coupled to the second winding 10172b, for generating the voltage control signal VCS according to the auxiliary voltage (The auxiliary voltage is related to the output voltage Vout, and therefore can serve as the voltage sense signal). The opto-coupler driver circuit 718 is coupled to for example the current control circuit 715 and the voltage control circuit 713, for generating an opto-coupler signal according to the current control signal ICS and/or the voltage control signal VCS. The opto-coupler driver circuit 718 is coupled to for example the current control circuit 715 and the voltage control circuit 713, for generating the opto-coupler signal according to the current control signal ICS and/or the voltage control signal VCS. The opto-coupler driver circuit 718 can determine to be controlled by the current control signal ICS or the voltage control signal VCS by the adaptive selection mode as shown in FIG. 9, or the controlled selection mode as shown in FIG. 10. The opto-coupler circuit 719 is coupled between the primary side circuit 711 and the opto-coupler driver circuit 718, for generating the regulation signal according to the opto-coupler signal and transmits the regulation signal to the primary side circuit 711.

Figure 12B:
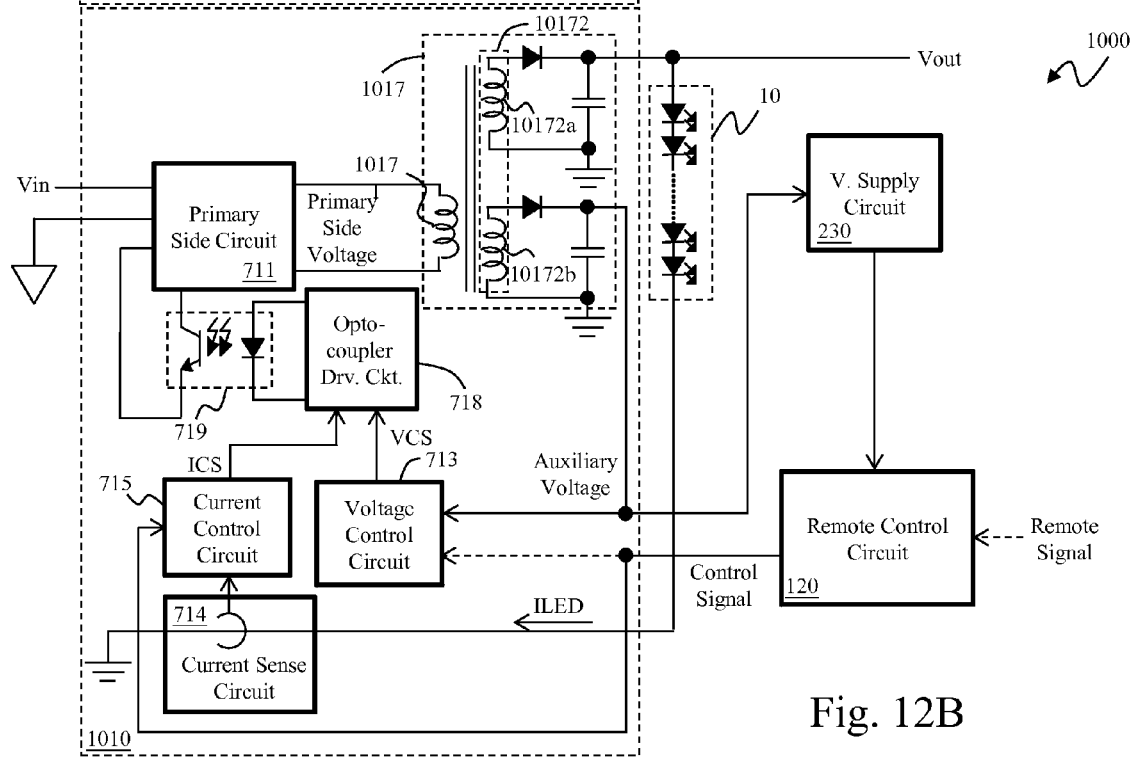

FIG. 12B shows another structure of the ninth embodiment according to the present invention, wherein the voltage supply circuit 230 converts the auxiliary voltage to the supply voltage required by the remote control circuit 120, instead of converting the output voltage Vout to the supply voltage. Because the auxiliary voltage is related to the output voltage Vout, the spirit of the present invention still applies, i.e., when the light emitting devices are turned OFF, the sum of the forward voltages across the light emitting devices is still capable of generating the supply voltage required by the operation of the remote control circuit 120. In this embodiment, the sum of the forward voltages across the light emitting devices is the output voltage Vout, and the auxiliary voltage (Vaux) is proportional to the output voltage Vout (Vaux=Vout*α) therefore, when the light emitting devices are OFF, the sum of the forward voltages across the light emitting devices (Vout) should preferably meet the relationship:

$$Vout > (supply\ voltage)/\alpha$$

Figure 13A:
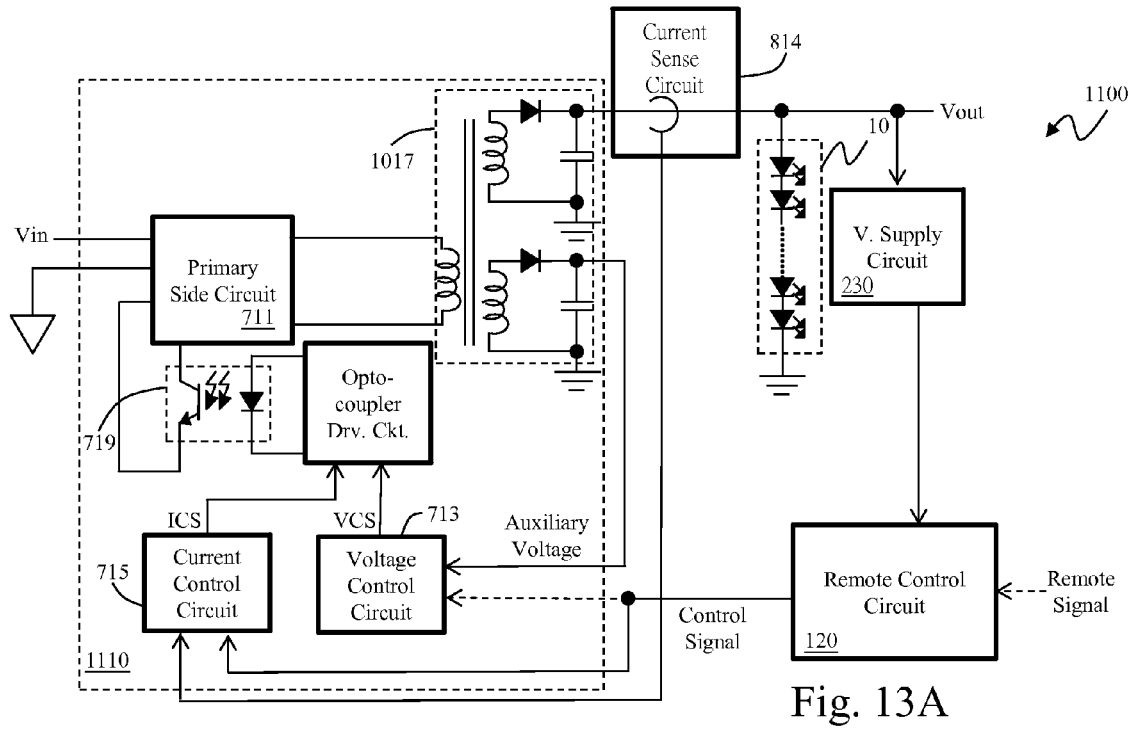
FIGS. 13A and 13B show two different structures of a tenth embodiment of the present invention.

FIG. 13A shows a tenth embodiment of the present invention. As shown in FIG. 13A, a light emitting device driver circuit 1100 includes a light emitting device control circuit 1110, the voltage supply circuit 230, and the remote control circuit 120. The light emitting device control circuit 1110 converts the input voltage Vin to the output voltage Vout according to the control signal and supplies the output voltage Vout to the light emitting device circuit. The light emitting device circuit is for example but not limited to the LED circuit 10. This embodiment is different from the ninth embodiment in that, in this embodiment, a current sense circuit 814 is coupled between the transformer circuit 1017 and the forward terminal of the LED circuit 10, while in the ninth embodiment, the current sense circuit 714 is coupled between a reverse terminal of the LED circuit 10 and the ground level.

Figure 13B:
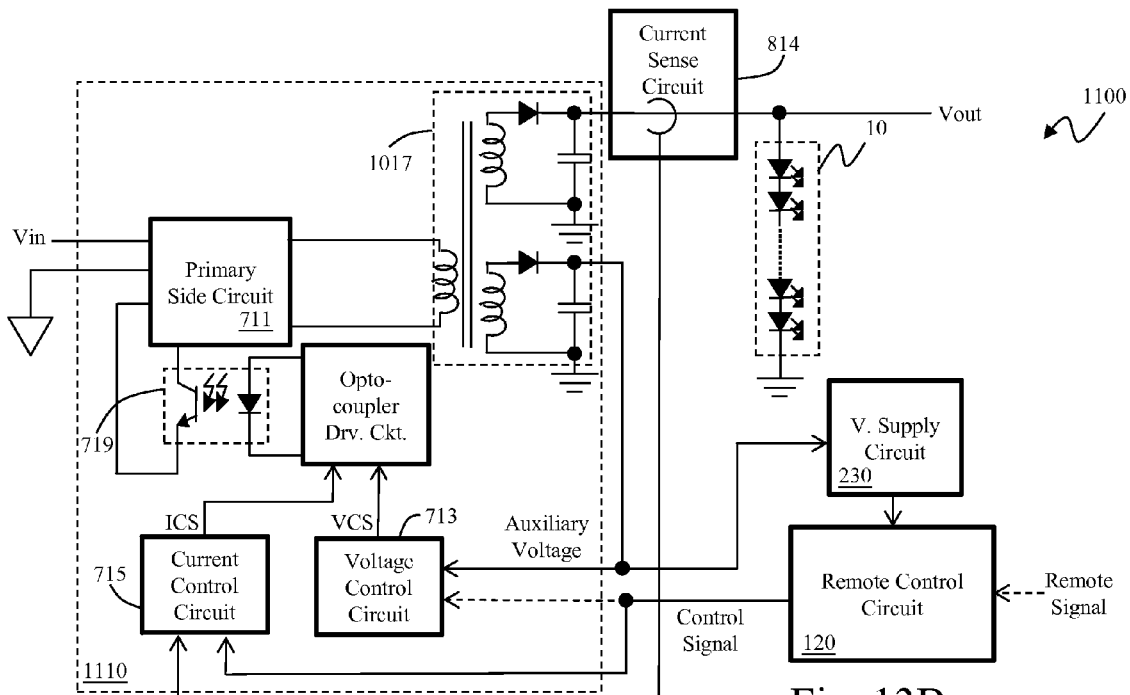

FIG. 13B shows another structure of the tenth embodiment according to the present invention, wherein the voltage supply circuit 230 converts the auxiliary voltage to the supply voltage required by the remote control circuit 120, instead of converting the output voltage Vout to the supply voltage. The rest of the circuit is similar to the circuit of FIG. 13A.

Figure 14:
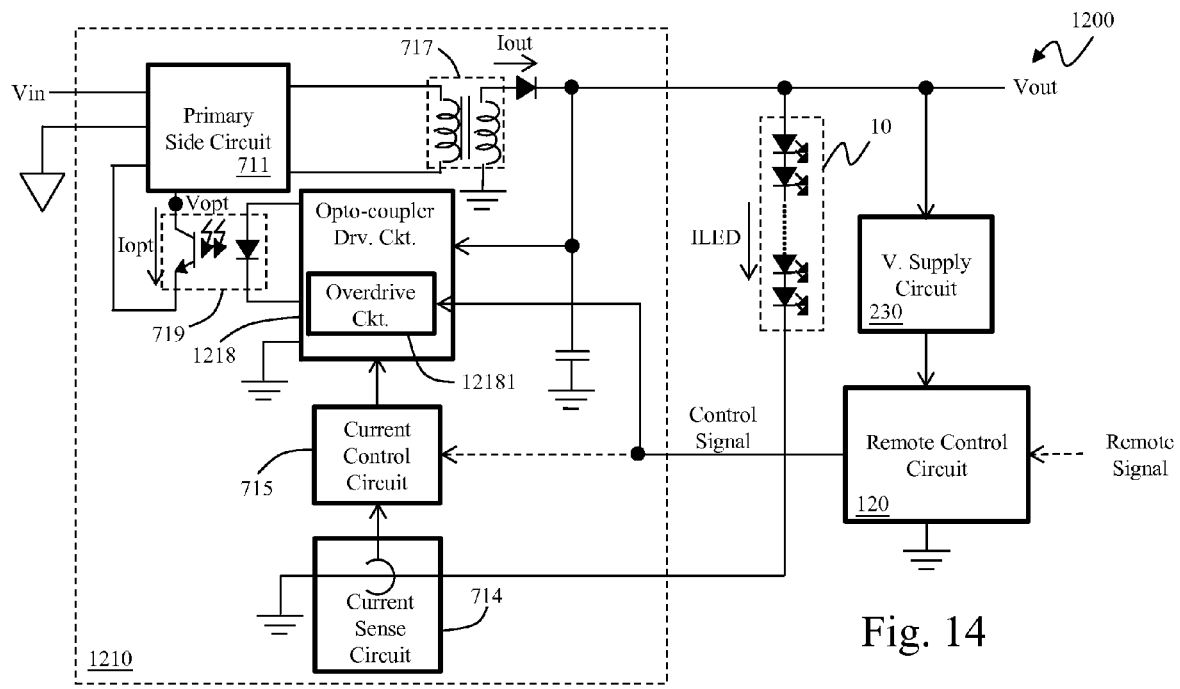
FIG. 14 shows an eleventh embodiment of the present invention.

FIG. 14 shows an eleventh embodiment of the present invention. As shown in FIG. 14, a light emitting device driver circuit 1200 includes a light emitting device control circuit 1210, a voltage supply circuit 230, and a remote control circuit 120. The light emitting device control circuit 1210 converts the input voltage Vin to the output voltage Vout according to the control signal and supplies the output voltage Vout to the light emitting device circuit. The light emitting device circuit is for example but not limited to the LED circuit 10. In this embodiment, the light emitting device control circuit 1210 is for example but not limited to an isolated circuit, which includes: a primary side circuit 711, a current sense circuit 714, a current control circuit 715, a transformer circuit 717, an opto-coupler driver circuit 1218, and an opto-coupler circuit 719. The primary side circuit 711 operates a power switch (not shown in this figure for simplicity, but will be shown later in another embodiment) according to an regulation signal to control the transformer circuit 717 to convert a primary side voltage to the output voltage Vout. Note that the concept of the present invention is applicable to an isolated or non-isolated DC/DC or AC/DC converter circuit, and if the present invention is applied to an isolated converter circuit, the isolated converter circuit may be primary or secondary side feedback controlled. This embodiment shows a specific example of the secondary side feedback controlled isolated type light emitting device control circuit 1210. This embodiment illustrates that the present invention can be embodied by other ways to generate the supply voltage when the light emitting device circuit is OFF, not necessarily in the ways as shown in the previous embodiments. That is, the supply voltage may be generated without the voltage feedback control loop, such as the voltage sense circuit and/or the voltage control circuit, in the second to the tenth embodiments.

Referring to FIG. 14, in this embodiment, the light emitting device control circuit 1210 includes an opto-coupler driver circuit 1218, which has an overdrive circuit 12181. When the LED circuit 10 is ON, the light emitting device driver circuit 1200 generates the supply voltage and supplies it to the remote control circuit 230 according to the same mechanism as the second to the tenth embodiments. When the LED circuit is OFF, the overdrive circuit 12181 overdrives the opto-coupler circuit 719 according to the control signal; in this way, sufficient output voltage Vout can still be generated so that the voltage supply circuit 230 can generate the supply voltage required by the remote control circuit 120. As described in the above, in general, the opto-coupler feedback in the isolated circuit is usually designed as negative feedback (i.e., when the level of the feedback signal is relatively high, the output voltage is regulated downward, and when the level of the feedback signal is relatively low, the output voltage is regulated upward). However, the output of the opto-coupler circuit 719 (the opto-coupler current Iopt) has its upper limit, and this upper limit is in positive correlation with the power source supplying power to the opto-coupler circuit 719 (in this example the power source is the output voltage Vout), i.e., the lower the output voltage Vout is, the lower the upper limit is. The opto-coupler current Iopt and the output voltage Vout interact with each other according to the correlation so that when the opto-coupler circuit 719 is over-driven, the upper limit of the opto-coupler current Iopt and the output voltage Vout will be balanced at a balanced point (referred to as the point BP hereinafter, the output voltage Vout at the level of this point is higher than the supply voltage but keeps the light emitting device circuit OFF). Therefore, when the current control signal ICS indicates that it is not required to regulate the LED current ILED, the output voltage Vout can be maintained at the balanced point BP by overdriving the opto-coupler circuit 719, and the output of the opto-coupler circuit 719 reaches its upper limit. By this overdrive mechanism, the supply voltage can be generated without the voltage sense circuit and the voltage control circuit. That is, when the LED circuit 10 is ON, the opto-coupler driver circuit 1218 adjusts the opto-coupler signal according to the output of the current control circuit 715, and the opto-coupler circuit 719 does not overdrive. When the LED circuit 10 is OFF, the opto-coupler driver circuit 1218 overdrives the opto-coupler circuit 719 according to the control signal, so that the opto-coupler signal reaches its upper limit to maintain the output voltage Vout at the balanced point BP, and this output voltage Vout is sufficient for the supply voltage to be generated.

More specifically, please refer to FIGS. 18A and 18B in conjunction with FIG. 14. FIGS. 18A and 18B show characteristic curves of the relationships between an output current Iout and an opto-coupler current Iopt, and the opto-coupler current Iopt and an opto-coupler voltage Vopt respectively. The output current Iout is in positive correlation with the output voltage Vout, and the opto-coupler voltage Vopt is also in positive correlation with the output voltage Vout. As shown in FIG. 18A, the output current Iout decreases if the opto-coupler current Iopt increases (the characteristic curve as shown is only a typical relationship in the isolated circuit). But if the output voltage Vout is lower than a certain extent, the opto-coupler driver circuit 718 cannot drive the opto-coupler circuit 719 to provide a feedback signal which is high enough to further lower the output voltage Vout, so the circuitry will balance at the point BP in the last. Thus, referring to FIG. 18B, a control method of the LED circuit 10 may be arranged as: when it is required to turn ON the LED circuit 10, the opto-coupler current Iopt is arranged to fall in a predetermined range, and when it is not required to turn ON the LED circuit 10, the opto-coupler circuit 719 is overdriven such that the opto-coupler current Iopt is at a level above the predetermined range at first, and the circuitry will balance at the point BP at the end, so that the voltage supply circuit 230 can keep generating the supply voltage even though the LED circuit 10 is OFF.

Figure 15:
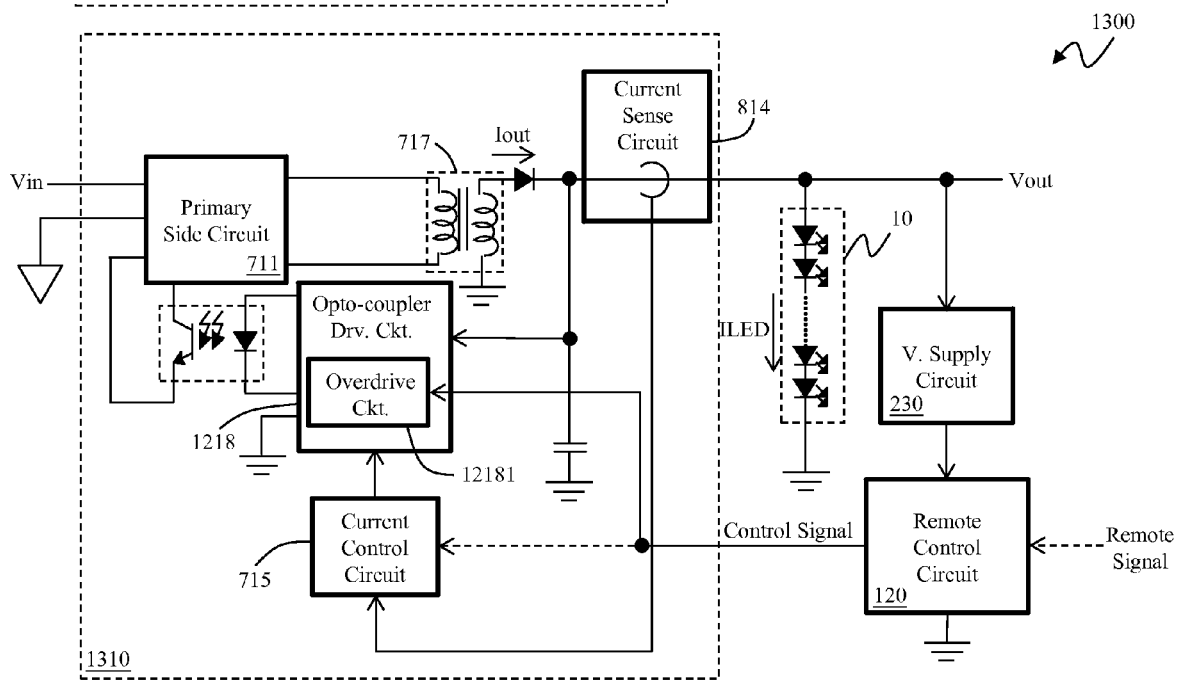
FIG. 15 shows a twelfth embodiment of the present invention.

FIG. 15 shows a twelfth embodiment of the present invention. As shown in FIG. 15, a light emitting device driver circuit 1300 includes a light emitting device control circuit 1310, a voltage supply circuit 230, and a remote control circuit 120. This embodiment is different from the eleventh embodiment in that, in this embodiment, the current sense circuit 814 is coupled between the transformer circuit 717 and the forward terminal of the LED circuit 10, while in the eleventh embodiment, the current sense circuit 714 is coupled between the reverse terminal of the LED circuit 10 and the ground level.

FIGS. 16A and 16B show a thirteenth embodiment, which are two specific examples of the selection circuit 316. As shown in FIG. 16A, the selection circuit 316 includes for example but not limited to diodes D1 and D2, and a resistor R1. The forward terminals of the diodes D1 and D2 receive the current control signal ICS and voltage control signal VCS respectively. The reverse terminals of the diodes D1 and D2 are coupled to the resistor R1 at a common node, where the selection circuit 316 generates the regulation signal or the opto-coupler driver circuit control signal. When the current control signal ICS and the voltage control signal VCS are both higher than the voltage at the common node voltage plus a diode forward bias voltage, both the diodes D1 and D2 will be conductive. However, the higher one of the current control signal ICS and the voltage control signal VCS will dominate, i.e., the voltage of the higher one minus the diode forward bias voltage will be the voltage at the common node, and this will cause the one of the diodes D1 and D2 which is connected to the lower one of the current control signal ICS and the voltage control signal VCS to be turned OFF. Thus, the selection circuit 316 operates in the adaptive selection mode. FIG. 16B shows another specific example of the selection circuit 316. This example is different from FIG. 16A in that, in the selection circuit 316 shown in FIG. 16B, the reverse terminals of the diodes D1 and D2 receive the current control signal ICS and the voltage control signal VCS respectively. Thus, the lower one of the current control signal ICS and the voltage control signal VCS will dominate to determine the regulation signal or the opto-coupler driver circuit control signal. The selection circuit 316 in this example also operates in the adaptive selection mode.

FIG. 17 shows a fourteenth embodiment of the present invention, which are two specific examples of the voltage sense circuit 312 (or 712) and the voltage control circuit 313 (or 713). As shown in FIG. 17, the voltage sense circuit 312 includes for example but not limited to two resistors connected in series, which are coupled between the output voltage Vout and the ground level. A division voltage across one of the resistors is the voltage sense signal, which is inputted to the voltage control circuit 313. The voltage control circuit 313 includes for example but not limited to a comparison circuit 3131, which compares the voltage sense signal with the reference signal Vref to generate the voltage control signal VCS.

Figure 19A:
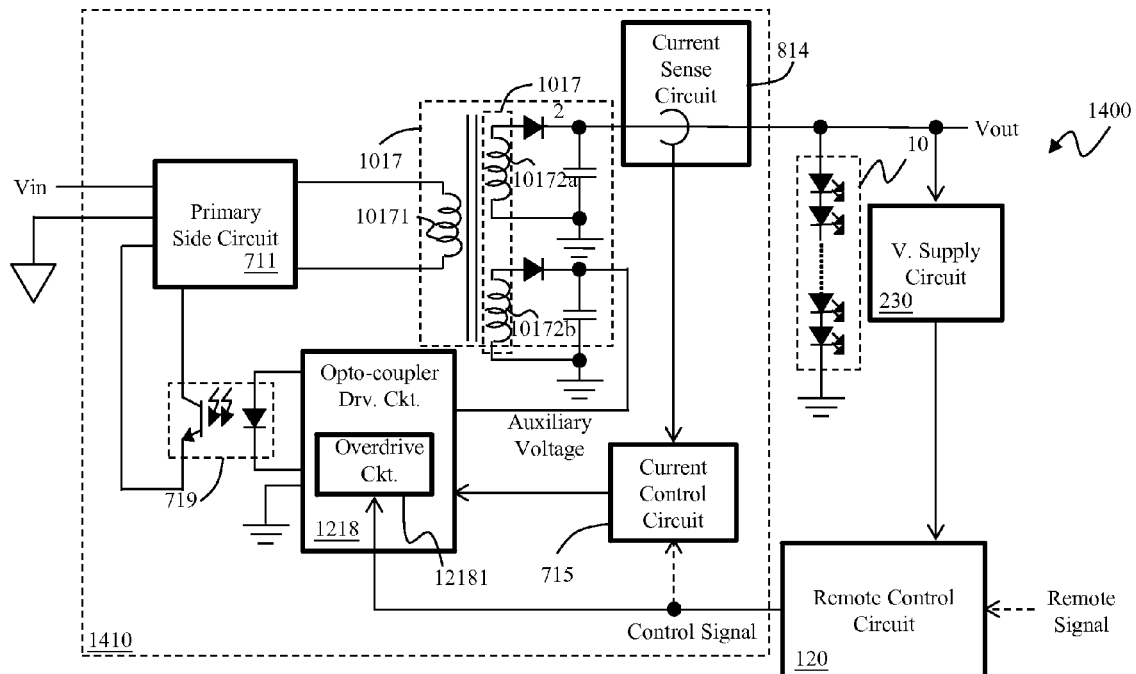
FIGS. 19A and 19B show two different structures of a fifteenth embodiment of the present invention.

FIG. 19A shows a fifteenth embodiment of the present invention. As shown in FIG. 19A, a light emitting device driver circuit 1400 includes a light emitting device control circuit 1410, a voltage supply circuit 230, and a remote control circuit 120. The light emitting device control circuit 1410 converts the input voltage Vin to the output voltage Vout according to the control signal and supplies the output voltage Vout to the light emitting device circuit. The light emitting device circuit is for example but not limited to the LED circuit 10. In this embodiment, the opto-coupler driver circuit 1218 is the same as the tenth embodiment, i.e., it includes an overdrive circuit 12181. This embodiment is different from the eleventh embodiment in that, in the transformer circuit 1017, the secondary side winding 10172 has the first winding 12172a and the second winding 12172b, and the opto-coupler driver circuit 1218 with the overdrive circuit 12181 also can be applied in this structure.

Figure 19B:
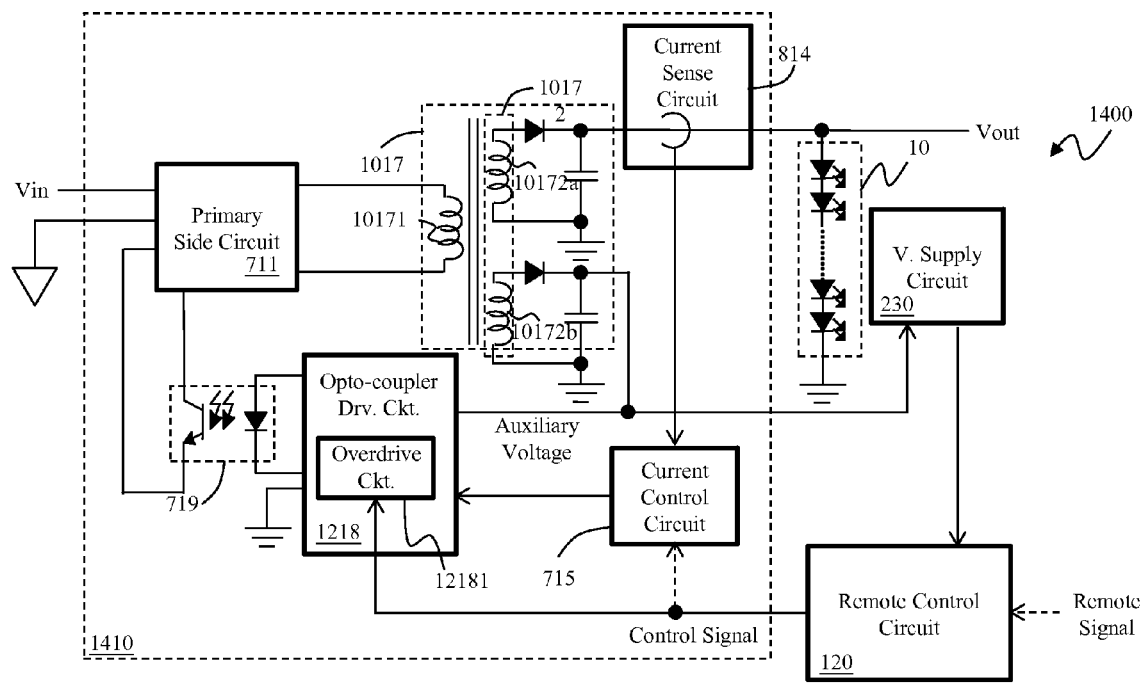

FIG. 19B shows another structure of the fifteenth embodiment according to the present invention, wherein the voltage supply circuit 230 converts the auxiliary voltage to the supply voltage required by the remote control circuit 120, instead of converting the output voltage Vout to the supply voltage. The rest of the circuit is similar to the circuit of FIG. 19A.

Figure 20A:
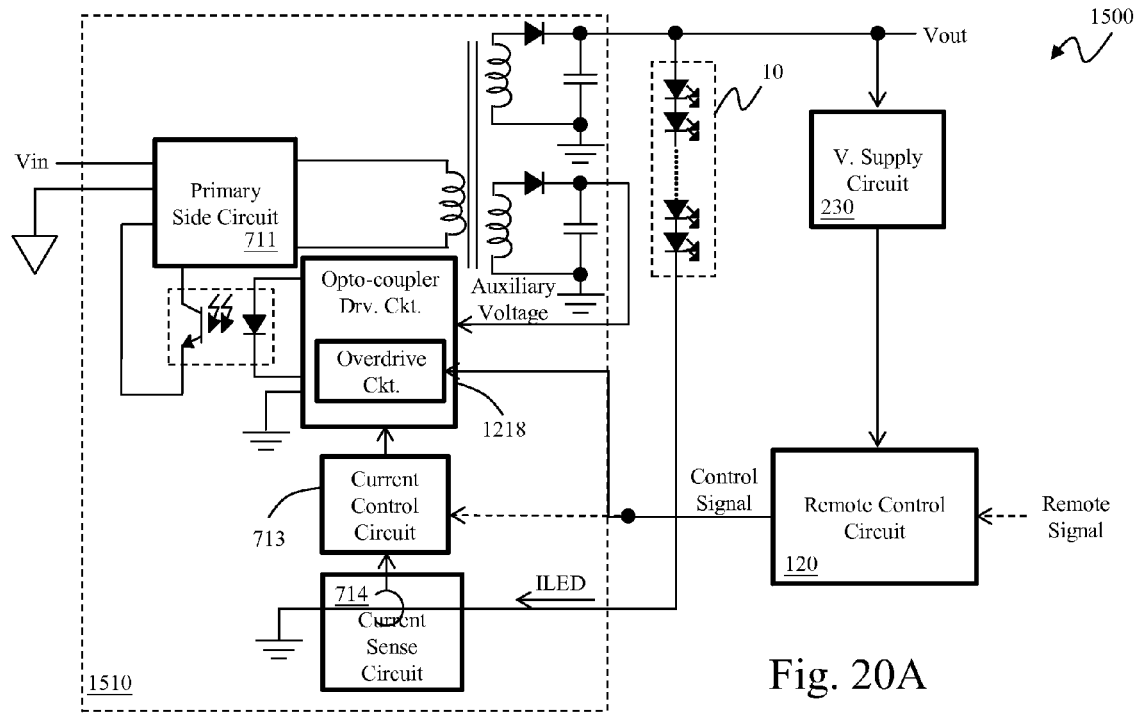
FIGS. 20A and 20B show two different structures of a sixteenth embodiment of the present invention.

FIG. 20A shows a sixteenth embodiment of the present invention. As shown in FIG. 20, a light emitting device driver circuit 1500 includes a light emitting device control circuit 1510, a voltage supply circuit 230, and a remote control circuit 120. This embodiment is different from the fifteenth embodiment in that, in this embodiment, the current sense circuit 714 is coupled between the reverse terminal and the ground level, while in the fifteenth embodiment, the current sense circuit 814 is coupled between the transformer circuit 1017 and the forward terminal of the LED circuit 10.

Figure 20B:
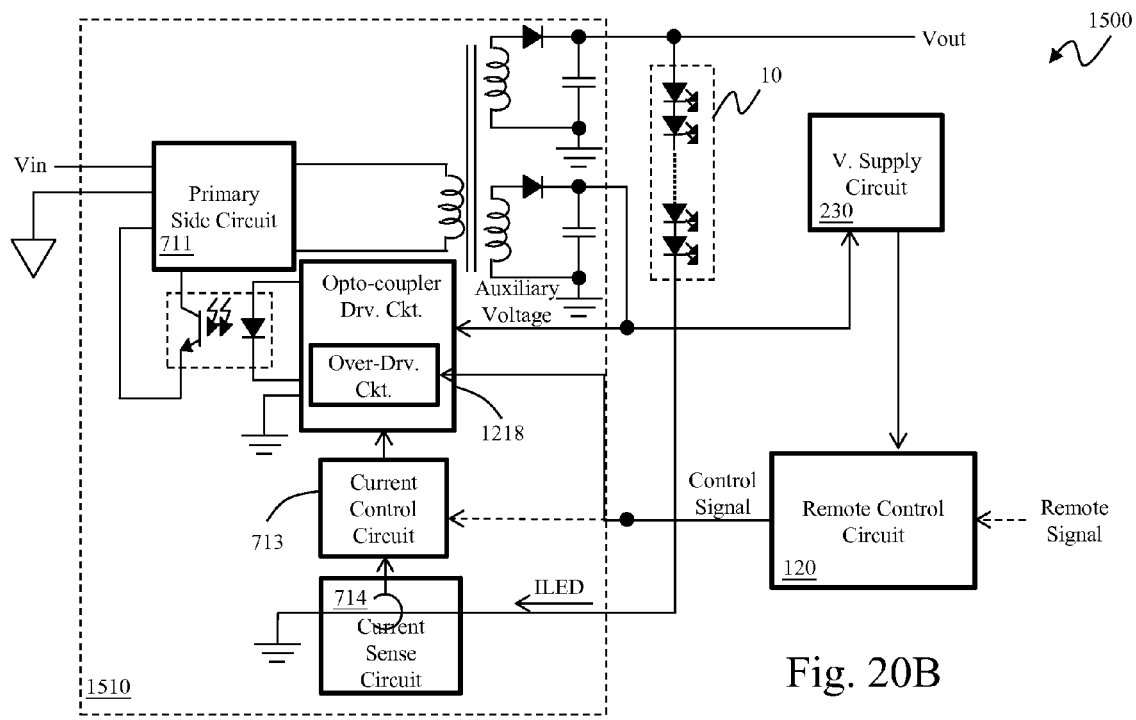

FIG. 20B shows another structure of the sixteenth embodiment according to the present invention, wherein the voltage supply circuit 230 converts the auxiliary voltage to the supply voltage required by the remote control circuit 120, instead of converting the output voltage Vout to the supply voltage. The rest of the circuit is similar to the circuit of FIG. 20A.

FIGS. 21A and 21B shows a seventeenth embodiment of the present invention, which are two specific examples of the opto-coupler driver circuit 1218. As shown in FIG. 21A, the opto-coupler driver circuit 1218 includes for example but not limited to the overdrive circuit 12181. When an overdrive signal turns ON a switch in the overdrive circuit 12181, the opto-coupler driver circuit 1218 overdrives the opto-coupler circuit 719; on the other hand, in normal operation, the opto-coupler circuit 719 is controlled by an LED ON signal, wherein the LED ON signal for example may be the aforementioned current control signal ICS or a signal for controlling the LED current, or a signal which indicates that the LED circuit 10 is or should be turned ON. FIG. 21B shows another example of the opto-coupler driver circuit 1218. This example shows that the LED ON signal and the overdrive signal can control the same switch in the overdrive circuit 12181, as long as the overdrive signal and the LED ON signal are set to have different levels.

FIG. 22 shows an eighteenth embodiment of the present invention. As shown in FIG. 22, a light emitting device driver circuit 1600 includes a light emitting device control circuit 1610, the LDO circuit 230, and a remote control circuit 120. The light emitting device control circuit 1610 converts the input voltage Vin to the output voltage Vout according to the control signal and supplies the output voltage Vout to the light emitting device circuit. The light emitting device circuit is for example but not limited to the LED circuit 10. The control signal includes for example but not limited to a conduction signal which determines ON or OFF of the LED circuit 10 and/or a dimming signal which determines the brightness of the LED circuit 10 (such as the PWM signal). In this embodiment, the light emitting device control circuit 1610 is for example but not limited to an isolated circuit, which includes: a transformer circuit 1517 and a primary side circuit 1611. The transformer circuit 1517 converts the input voltage Vin to the output voltage Vout, which has a primary side winding PW and a secondary side winding SW. The primary side winding PW includes a first winding W1 and a second winding W2. One end of the first winding W1 is coupled to the input voltage Vin, and the other end of the first winding W1 is coupled to and controlled by a power switch Q1. The second winding W2 can provide a function of voltage sense. Because the second winding W2 is responsive to the voltage or current change of the first winding W1 in the same or a similar way as the secondary side winding SW is, the voltage across the second winding W2 can be used to indicate the information related to the output voltage Vout. Or, from a different perspective, it can be considered as that the second winding W2 is responsive to a voltage across the secondary side winding SW. The voltage of the secondary side winding SW is related to the output voltage Vout and therefore the secondary winding W2 can sense the output voltage Vout. The auxiliary voltage generated by the second winding W2 is also used to provide an operation voltage VDD to the primary side circuit 1611. The secondary side winding SW is coupled between the output voltage Vout and the ground level. The primary side circuit 1611 operates the power switch Q1 according to the control signal, to convert the input voltage Vin to the output voltage Vout. The voltage supply circuit 230 is coupled to the second winding W2 to generate the supply voltage from the auxiliary voltage (because the operation voltage VDD comes from the auxiliary voltage, to generate the supply voltage from the operation voltage VDD can be considered as generating the supply voltage from the auxiliary voltage in a broad sense). The remote control circuit 120 is coupled to the voltage supply circuit 230 to receive the supply voltage, and it generates the control signal according to the remote signal.

Please refer to FIG. 22. The primary circuit 1611 includes: the power switch Q1, a current sense circuit 1612, a current control circuit 1613, a voltage sense circuit 1614, a voltage control circuit 1615, and a regulation signal generation circuit 1616. The power switch Q1 is coupled to the first winding W1, and it switches according to the regulation signal (switching signal is one form of the regulation signal) to convert the input voltage Vin to the output voltage Vout. The current sense circuit 1612 includes for example but not limited to a resistor as shown in the figure, which is coupled to the power switch Q1, for sensing a current flowing through the power switch Q1 to generate the current sense signal. The current control circuit 1613 includes for example but not limited to a comparison circuit A1 as shown in the figure, which is coupled to the current sense circuit 1612, for generating the current control signal ICS according to the current sense signal and a reference signal REF1. The comparison circuit A1 may be an analog differential amplifier or a digital comparator, depending on how its output is processed. The voltage sense circuit 1614 is coupled to the second winding W2, which includes for example but not limited to two resistors connected in series as shown in the figure. The voltage sense signal is generated according to a division voltage across one of the two resistors, which is related to the output voltage Vout. The voltage control circuit 1615 is coupled to the voltage sense circuit 1614, for generating the voltage control signal VCS according to the voltage sense signal. The regulation signal generation circuit 1616 is coupled to the current control circuit 1613 and the voltage control circuit 1615, for generating the regulation signal according to the current control signal ICS and/or the voltage control signal VCS, and the power switch Q1 operates according to the regulation signal.

In this embodiment, the voltage control circuit 1615 includes for example but not limited to a reference voltage generation circuit 1617 and a comparison circuit 1618. The reference voltage generation circuit 1617 is coupled to the remote control circuit 120, for generating a reference signal according to the control signal. The comparison circuit 1618 is coupled to the voltage sense circuit 1614 and the reference voltage generation circuit 1617, for generating the voltage control signal VCS according to the voltage sense signal and the reference signal.

Figure 23:
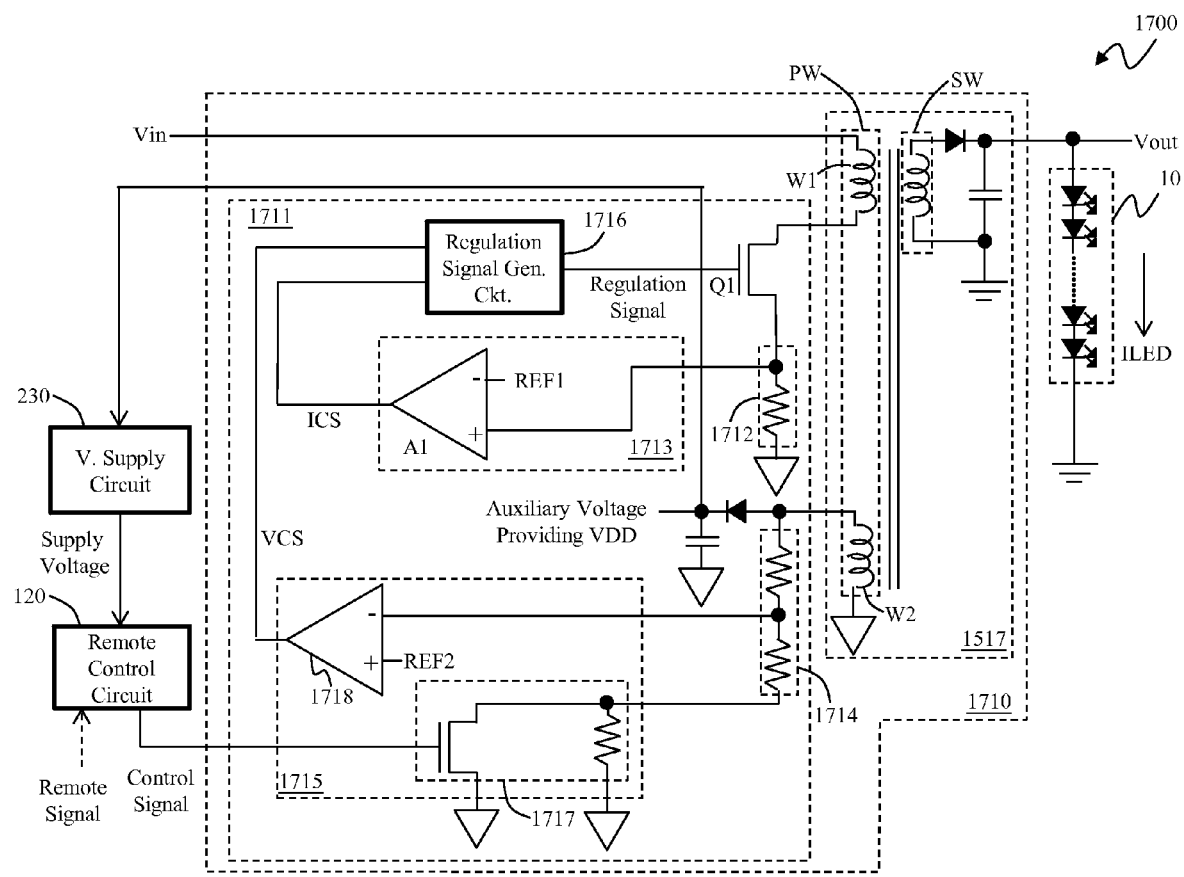
FIG. 23 shows a nineteenth embodiment of the present invention.

FIG. 23 shows a nineteenth embodiment of the present invention. As shown in FIG. 23, a light emitting device driver circuit 1700 includes a light emitting device control circuit 1710, an LDO circuit 230, and a remote control circuit 120. The light emitting device control circuit 1710 converts the input voltage Vin to the output voltage Vout according to the control signal and supplies the output voltage Vout to the light emitting device circuit. The light emitting device circuit is for example but not limited to the LED circuit 10. The control signal includes for example but not limited to a conduction signal which determines ON or OFF of the LED circuit 10 and/or a dimming signal which determines the brightness of the LED circuit 10 (such as the PWM signal). In this embodiment, the light emitting device control circuit 1710 is for example but not limited to an isolated circuit, which includes: a transformer circuit 1517 and a primary side circuit 1711. The transformer circuit 1517 converts the input voltage Vin to the output voltage Vout, which has a primary side winding PW and a secondary side winding SW. The primary side winding PW includes a first winding W1 and a second winding W2. One end of the first winding W1 is coupled to the input voltage Vin, and the other end of the first winding W1 is coupled to and controlled by a power switch Q1. The second winding W2 can provide a function of voltage sense. The auxiliary voltage generated by the second winding W2 is also used to provide an operation voltage VDD to the primary side circuit 1611. The secondary side winding SW is coupled between the output voltage Vout and the ground level. The primary side circuit 1711 operates the power switch Q1 according to the control signal, to convert the input voltage Vin to the output voltage Vout. The voltage supply circuit 230 is coupled to the second winding W2 to generate the supply voltage from the auxiliary voltage (because the operation voltage VDD comes from the auxiliary voltage, to generate the supply voltage from the operation voltage VDD can be considered as generating the supply voltage from the auxiliary voltage in a broad sense). The remote control circuit 120 is coupled to the voltage supply circuit 230 to receive the supply voltage, and it generates the control signal according to the remote signal.

Please refer to FIG. 23. The primary circuit 1711 includes: the power switch Q1, a current sense circuit 1712, a current control circuit 1713, a voltage sense circuit 1714, a voltage control circuit 1715, and a regulation signal generation circuit 1716. The power switch Q1 is coupled to the first winding W1, and it switches according to the regulation signal to convert the input voltage Vin to the output voltage Vout. The current sense circuit 1712 includes for example but not limited to a resistor as shown in the figure, which is coupled to the power switch Q1, for sensing a current flowing through the power switch Q1 to generate the current sense signal. The current control circuit 1713 includes for example but not limited to a comparison circuit A1 as shown in the figure, which is coupled to the current sense circuit 1712, for generating the current control signal ICS according to the current sense signal and a reference signal REF1. The voltage sense circuit 1714 is coupled to the second winding W2, which includes for example but not limited to two resistors connected in series as shown in the figure. The voltage sense signal is generated according to a division voltage across one of the two resistors, which is related to the output voltage Vout. The voltage control circuit 1715 is coupled to the voltage sense circuit 1714, for generating the voltage control signal VCS according to the voltage sense signal. The regulation signal generation circuit 1716 is coupled to the current control circuit 1713 and the voltage control circuit 1715, for generating the regulation signal according to the current control signal ICS and/or the voltage control signal VCS. The power switch Q1 operates according to the regulation signal.

In this embodiment, the voltage control circuit 1715 includes for example but not limited to a voltage sense signal adjustment circuit 1717 and a comparison circuit 1718. The voltage sense signal adjustment circuit 1717 is coupled to the remote control circuit 120 and the voltage sense circuit 1714, for adjusting the voltage sense signal according to the control signal. The comparison circuit 1718 is coupled to the voltage sense circuit 1714, for generating the voltage control signal VCS according to the adjusted voltage sense signal and a reference signal REF2.

The eighteenth and nineteenth embodiments preferably operate in a manner that, when it is required to turn ON the LED circuit 10, the regulation target of the light emitting device control circuits 1610 and 1710 is the LED current ILED. wherein the light emitting device control circuit 1610 or 1710 regulates the LED current ILED at a predetermined current by controlling the output voltage Vout to be larger than the ON voltage VON multiplied by the number N of the LEDs connected in series of the LED circuit 10; when it is required to turn OFF the LED circuit 10, the regulation target of the light emitting device control circuits 1610 and 1710 is the output voltage Vout, wherein the light emitting device control circuit 1610 or 1710 regulates the output voltage Vout at a predetermined voltage which is smaller than the OFF voltage VOFF multiplied by the number N of the LEDs connected in series of the LED circuit 10. Note that, the eighteenth and nineteenth embodiments are different from the second embodiment in that, the eighteenth and nineteenth embodiments sense the output voltage Vout at the primary side, and the supply voltage of the remote control circuit 120 is not generated from the output voltage Vout, but from the operation voltage VDD (or the auxiliary voltage). Therefore, when the LED circuit 10 is OFF, it is only required for the output voltage Vout to be smaller than the OFF voltage VOFF multiplied by the number N of the LEDs connected in series of the LED circuit 10, and the operation voltage VDD (or the auxiliary voltage) to be sufficient to generate the supply voltage for the remote control circuit 120. The eighteenth and nineteenth embodiments do not need to keep the output voltage higher than or equal to the supply voltage as the second embodiment.

Another operation method of the eighteenth and nineteenth embodiments is that, when the output voltage Vout is larger than the ON voltage VON multiplied by the number N of the LEDs connected in series of the LED circuit 10, the light emitting device control circuit 1610 or 1710 regulates the LED current ILED at a predetermined current which is supplied to the LED circuit 10. When the output voltage Vout is smaller than the OFF voltage VOFF multiplied by the number N of the LEDs connected in series of the LED circuit 10, the light emitting device control circuit 1610 or 1710 regulate the operation voltage VDD at a predetermined voltage. In summary, in the structure of sensing the output voltage Vout at the primary side, the supply voltage of the remote control circuit 120 is not generated from the output voltage Vout, but from the operation voltage VDD. Therefore, when it is required to turn OFF the LED circuit 10, the output voltage Vout is not critical, and it is only required for the output voltage Vout to be smaller than the OFF voltage VOFF so that the LED circuit 10 is OFF, and that the operation voltage VDD is sufficient to generate the supply voltage for the remote control circuit 120 (i.e., the operation voltage VDD is kept not lower than the supply voltage).

Figure 24A:
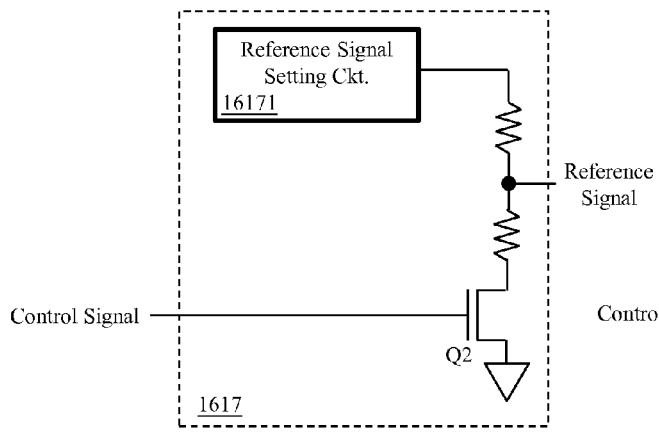
FIGS. 24A and 24B show a twentieth embodiment of the present invention.
Figure 24B:
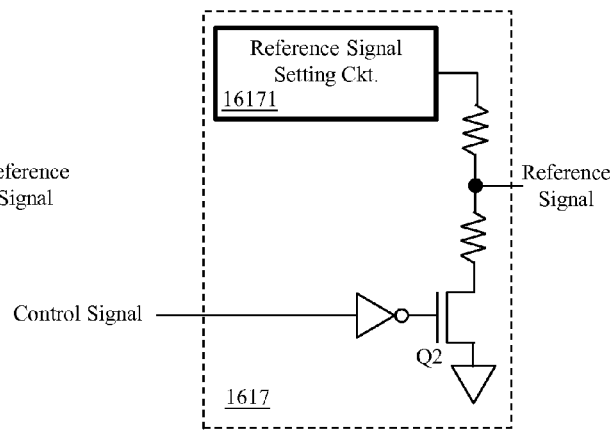

FIGS. 24A and 24B show a twentieth embodiment of the present invention, which are two specific examples of the reference voltage generation circuit 1617. As shown in FIG. 25A, the reference voltage generation circuit 1617 includes for example but not limited to a reference signal setting circuit 16171, two resistors connected in series, and a switch Q2. The two resistors are coupled between the reference signal setting circuit 16171 and the switch Q2. The reference signal setting circuit 16171 provides a predetermined reference signal. The switch Q2 receives the control signal and operates according to it. The output reference signal switches between two different voltage levels according to the control signal received by the switch Q2, one of the voltage levels being the predetermined reference signal provided by the reference signal setting circuit 16171 and the other of the voltage levels being the division voltage across one of the two resistors. The control signal determines one of them as the reference signal to be inputted to the comparison circuit 1618. The reference voltage generation circuit 1617 shown in FIG. 24B is different from the circuit in FIG. 24A in that, in FIG. 24B, the control signal may be inverted.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or the like, so the term "couple" should include direct and indirect connections. For another example, other typical circuits such as an over voltage protection circuit, an over current protection circuit, an over temperature protection circuit etc. can be added in any one of the embodiments. For another example, the light emitting device is not limited to the LED as shown in the embodiments of the present, but the light emitting device may be any light emitting device driven by current. For another example, if the primary side and the secondary side of the isolated circuit is grounded to a common level, then the isolated circuit becomes a non-isolated circuit. For another example, the meanings of the high and low levels of a digital signal are interchangeable, with corresponding amendment of the circuits processing these signals. For another example, the term "or" in the claims and the specification should include the scope of "and". For example, in the embodiments described in the above, the light emitting device control circuit controls the power circuit according to the current control signal ICS "or" the voltage control signal VCS, but when the light emitting device control circuit regulates the light emitting device current according to the current control signal ICS, if the voltage is too high, this may trigger the light emitting device control circuit to execute an emergency procedure according to the voltage sense signal or the voltage control signal. And when the light emitting device control circuit regulates or controls the output voltage according to the current control signal ICS or the voltage control signal VCS, if the circuit current is too high, this also may trigger the light emitting device control circuit to execute an emergency procedure according to the current sense signal or the current control signal, so the scope of "or" does not exclude "and". For another example, the positive and negative input terminals of the comparison circuits are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. A light emitting device driver circuit, comprising:
a light emitting device control circuit, for converting an input voltage to an output voltage according to a control signal and supplying the output voltage to a light emitting device circuit;
a voltage supply circuit, which is coupled to the light emitting device circuit, for generating a supply voltage from the output voltage or a voltage related to the output voltage; and
a remote control circuit, which is coupled to the voltage supply circuit, for receiving the supply voltage and generating the control signal according a remote signal,
wherein when the light emitting device circuit is ON, the light emitting device control circuit regulates a current flowing through the light emitting device circuit, and when the light emitting device circuit is OFF, the light emitting device control circuit regulates the output voltage to a level sufficient for the voltage supply circuit to generate the supply voltage.

2. The light emitting device driver circuit of claim 1, wherein when the output voltage is larger than a first threshold voltage, the light emitting device circuit is turned ON, and when the output voltage is smaller than a second threshold voltage, the light emitting device circuit is turned OFF, wherein the first threshold voltage is not smaller than the second threshold voltage, and the output voltage or the voltage related to the output voltage is not smaller than the supply voltage.

3. The light emitting device driver circuit of claim 1, wherein when the output voltage is larger than a first threshold voltage, the light emitting device control circuit regulates an output current and supplies the output current to the light emitting device circuit, and when the output voltage is smaller than a second threshold voltage, the light emitting device control circuit regulates the output voltage or the voltage related to the output voltage to be not smaller than a predetermined voltage, wherein the first threshold voltage is not smaller than the second threshold voltage, and the predetermined voltage is not smaller than the supply voltage.

4. The light emitting device driver circuit of claim 2, wherein the voltage supply circuit includes a low drop-out regulator (LDO) circuit.

5. The light emitting device driver circuit of claim 1, wherein the light emitting device control circuit is a non-isolated circuit, including:
a power circuit, for converting the input voltage to the output voltage according to a regulation signal;

a voltage sense circuit, which is coupled to the power circuit, for sensing the output voltage and generating a voltage sense signal;

a voltage control circuit, which is coupled to the voltage sense circuit, for generating a voltage control signal according to the voltage sense signal;

a current sense circuit, which is coupled to the light emitting device circuit, for sensing the current flowing through the light emitting device circuit and generating a current sense signal;

a current control circuit, which is coupled to the current sense circuit, for generating a current control signal according to the current sense signal; and a selection circuit, which is coupled to the voltage control circuit and the current control circuit, for determining a selection between the current control signal and the voltage control signal, and the regulation signal is generated according to the selection.

6. The light emitting device driver circuit of claim 5, wherein the selection circuit operates in an adaptive selection mode which selects the current control signal in higher priority to the voltage control signal or which selects the voltage control signal in higher priority to the current control signal.

7. The light emitting device driver circuit of claim 5, wherein the light emitting device control circuit further includes a control signal analysis circuit, which is coupled to the remote control circuit, for generating a selection signal according to the control signal, wherein the selection signal is inputted to the selection circuit so as to determine the regulation signal.

8. The light emitting device driver circuit of claim 7, wherein the control signal analysis circuit further generates an enable signal according to the control signal, and the enable signal is transmitted to the current control circuit or the voltage control circuit.

9. The light emitting device driver circuit of claim 7, wherein the control signal is an enable signal which is transmitted to the current control circuit or the voltage control circuit.

10. The light emitting device driver circuit of claim 1, wherein the light emitting device control circuit is an isolated circuit, including:
  a primary side circuit, for operating a power switch therein according to an regulation signal;
  a transformer circuit, for converting a primary side voltage which is related to the input voltage to the output voltage, the transformer circuit including:
    a primary side winding, which is coupled to the primary side voltage, and is controlled by the power switch of the primary side circuit; and
    a secondary side winding, which is coupled to the output voltage;
  a current sense circuit, for generating a current sense signal by sensing the current flowing through the light emitting device circuit;
  a current control circuit, which is coupled to the current sense circuit, for generating a current control signal according to the current sense signal;
  an opto-coupler driver circuit, which is coupled to the current control circuit, for generating an opto-coupler signal according to the current control signal when the light emitting device circuit is turned ON; and
  an opto-coupler circuit, which is coupled between the primary side circuit and the opto-coupler driver circuit, for generating the regulation signal according to the opto-coupler signal and transmitting the regulation signal to the primary side circuit.

11. The light emitting device driver circuit of claim 10, wherein the light emitting device control circuit further includes a voltage control circuit, for generating a voltage control signal according to the output voltage.

12. The light emitting device driver circuit of claim 11, wherein the light emitting device control circuit further includes a voltage sense circuit, which is coupled to the secondary side winding, for sensing the output voltage and generating a voltage sense signal which is inputted to the voltage control circuit.

13. The light emitting device driver circuit of claim 11, wherein the light emitting device circuit further includes a selection circuit, for determining whether to generate an opto-coupler driver circuit control signal to control the opto-coupler driver circuit according to the current control signal or the voltage control signal.

14. The light emitting device driver circuit of claim 13, wherein the light emitting device control circuit further includes a control signal analysis circuit, which is coupled to the remote control circuit, for generating a selection signal to be inputted to the selection circuit according to the control signal, so as to determine the opto-coupler driver circuit control signal.

15. The light emitting device driver circuit of claim 11, wherein the opto-coupler driver circuit operates in an adaptive selection mode wherein the opto-coupler driver circuit generates the opto-coupler signal according to the current control signal in higher priority to the voltage control signal or generates the opto-coupler signal according to the voltage control signal in higher priority to the current control signal.

16. The light emitting device driver circuit of claim 11, wherein the secondary side winding includes a first winding and a second winding, wherein the first winding is coupled to the output voltage, and the second winding is for sensing the output voltage and generating the voltage related to the output voltage.

17. The light emitting device driver circuit of claim 10, wherein the current control circuit is coupled to the remote control circuit, to be controlled by the control signal to generate the current control signal.

18. The light emitting device driver circuit of claim 10, wherein the opto-coupler driver circuit further includes an overdrive circuit, which is coupled to the remote control circuit, for overdriving the opto-coupler circuit when the light emitting device circuit is OFF.

19. The light emitting device driver circuit of claim 18, wherein when the opto-coupler driver circuit overdrives the opto-coupler circuit, the output voltage balances at a point wherein the light emitting device circuit OFF and the output voltage or the voltage related to the output voltage is not smaller than the supply voltage.

20. A light emitting device driver circuit, comprising:
  a light emitting device control circuit, for converting an input voltage to an output voltage according to a control signal and supplying the output voltage to a light emitting device circuit, wherein the light emitting device control circuit is an isolated circuit, including:
    a transformer circuit, for converting the input voltage to the output voltage, the transformer circuit including:
      a primary side winding, which includes a first winding and a second winding; and
      a secondary side winding, which is coupled to the output voltage; and
    a primary side circuit, for operating a power switch therein according to the control signal to convert the input voltage to the output voltage;

wherein the first winding is coupled to the input voltage and the power switch, and the second winding generates an auxiliary voltage according to the output voltage;

a voltage supply circuit, which is coupled to the second winding, for generating a supply voltage from the auxiliary voltage; and a remote control circuit, which is coupled to the voltage supply circuit, for generating the control signal according to a remote signal, wherein the voltage supply circuit supplies the supply voltage to the remote control circuit, wherein when the light emitting device circuit is ON, the light emitting device control circuit regulates a current flowing through the light emitting device circuit, and when the light emitting device circuit is OFF, the light emitting device control circuit operates such that the auxiliary voltage is not smaller than the supply voltage.

21. The light emitting device driver circuit of claim 20, wherein the primary side circuit includes:

a power switch, which is coupled to the first winding, for controlling the first winding according to a regulation signal to convert the input voltage to the output voltage;

a current sense circuit, which is coupled to the power switch, for generating a current sense signal by sensing a current flowing through the power switch;

a current control circuit, which is coupled to the current sense circuit, for generating a current control signal according to the current sense signal;

a voltage control circuit, for generating a voltage control signal according to the auxiliary voltage; and a regulation signal generation circuit, which is coupled to the current control circuit and the voltage control circuit, for generating the regulation signal according to the current control signal or the voltage control signal.

22. The light emitting device driver circuit of claim 21, wherein the primary side circuit further includes a voltage sense circuit, which is coupled to the second winding, for generating a voltage sense signal by sensing the auxiliary voltage, and wherein the voltage control circuit generates the voltage control signal according to the voltage sense signal.

23. The light emitting device driver circuit of claim 22, wherein the voltage control circuit includes:

a reference voltage generation circuit, which is coupled to the remote control circuit, for generating a reference signal according to the control signal; and a comparison circuit, which is coupled to the voltage sense circuit and the reference voltage generation circuit, for generating the voltage control signal according to the voltage sense signal and the reference signal.

24. The light emitting device driver circuit of claim 22, wherein the voltage control circuit includes:

a voltage sense signal adjustment circuit, which is coupled to the remote control circuit and the voltage sense circuit, for adjusting the voltage sense signal according to the control signal; and a comparison circuit, which is coupled to the voltage sense circuit, for generating the voltage control signal according to the voltage sense signal and a reference signal.

25. A control method of a light emitting device driver circuit, comprising:

converting an input voltage to an output voltage according to a control signal and supplying the output voltage to a light emitting device circuit;

generating a supply voltage from the output voltage or a voltage related to the output voltage; and supplying the supply voltage to a remote control circuit, and generating the control signal by the remote control circuit according to a remote signal, wherein when the output voltage is larger than a first threshold voltage, the light emitting device circuit is ON, and when the output voltage is smaller than a second threshold voltage, the light emitting device circuit is OFF, wherein the first threshold voltage is not smaller than the second threshold voltage, and when the light emitting device circuit is OFF, the output voltage or the voltage related to the output voltage is not smaller than the supply voltage.

26. The control method of claim 25, further comprising: regulating a current flowing through the light emitting device circuit when the output voltage is larger than the first threshold voltage, and regulating the output voltage or the voltage related to the output voltage to be not smaller than a predetermined voltage when the output voltage is smaller than the second threshold voltage, wherein the predetermined voltage is not smaller than the supply voltage.

27. The control method of claim 25, wherein the step of converting an input voltage to an output voltage according to a control signal includes:

converting the input voltage to the output voltage according to a regulation signal which is determined by the control signal;

generating a voltage sense signal by sensing the output voltage or the voltage related to the output voltage;

generating a voltage control signal according to the voltage sense signal;

generating a current sense signal by sensing a current flowing through the light emitting device circuit;

generating a current control signal according to the current sense signal; and generating the regulation signal according to the voltage control signal or the current control signal.

28. The control method of claim 27, wherein the step of converting an input voltage to an output voltage according to a control signal further includes: generating a selection signal according to the control signal to determine whether the regulation signal is generated according to the voltage control signal or the current control signal.

29. The control method of claim 27, wherein the step of converting an input voltage to an output voltage according to a control signal further includes: generating an enable signal according to the control signal, to control the current control signal or the voltage control signal.

30. The control method of claim 25, wherein the step of converting an input voltage to an output voltage according to a control signal includes:

converting the input voltage to the output voltage according to an regulation signal which is determined by the control signal;

generating a current sense signal by sensing a current flowing through the light emitting device circuit;

generating a current control signal according to the current sense signal;

generating an opto-coupler signal according to the current control signal when the light emitting device circuit is ON, and generating the regulation signal according to the opto-coupler signal.

31. The control method of claim 30, wherein the step of converting an input voltage to an output voltage according to a control signal further includes: generating a voltage control signal according to the output voltage for determining the opto-coupler signal when the light emitting device is OFF.

32. The control method of claim 31, wherein the step of converting an input voltage to an output voltage according to a control signal further includes: deciding whether to generate an opto-coupler driver circuit control signal for determining the opto-coupler signal according to the current control signal or the voltage control signal.

33. The control method of claim 30, wherein the step of converting an input voltage to an output voltage according to a control signal further includes: overdriving an opto-coupler circuit when the light emitting device circuit is OFF, wherein the opto-coupler circuit is for generating the regulation signal.

34. The control method of claim 33, wherein when the opto-coupler circuit is overdriven, the output voltage balances at a point wherein the light emitting device circuit OFF and the output voltage or the voltage related to the output voltage is not smaller than the supply voltage.

35. A control method of a light emitting device driver circuit, comprising:
   determining an regulation signal according to a control signal, for controlling a transformer to convert an input voltage to an output voltage which is supplied to a light emitting device circuit, wherein the transformer has a primary side winding and a secondary side winding, and the primary side winding includes a first winding and a second winding;
generating a auxiliary voltage by the second winding according to the output voltage;
generating a supply voltage from the auxiliary voltage; and
supplying the supply voltage to a remote control circuit, and generating the control signal by the remote control circuit according to a remote signal,
wherein when the output voltage is larger than a first threshold voltage, the light emitting device circuit is ON, and when the output voltage is smaller than a second threshold voltage, the light emitting device circuit is OFF, wherein the first threshold voltage is not smaller than the second threshold voltage, and when the light emitting device circuit is OFF, the auxiliary voltage is not smaller than the supply voltage.

* * * * *